United States Patent
Roentgen et al.

(10) Patent No.: US 9,193,870 B2
(45) Date of Patent: Nov. 24, 2015

(54) FIBRE-REACTIVE DYES, THEIR PREPARATION AND THEIR USE

(71) Applicant: Huntsman International LLC, The Woodlands, TX (US)

(72) Inventors: Georg Roentgen, Freiburg (DE); Jean-Christophe Graciet, Village-Neuf (FR); Rainer Hildebrand, Lorrach (DE); Laszlo Fekete, Magden (CH); Marie Schmidlin, Bouxwiller (FR); Hubert Jean-Luc Christnacher, Dietwiller (FR)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 14/400,581

(22) PCT Filed: May 24, 2013

(86) PCT No.: PCT/EP2013/060759
§ 371 (c)(1),
(2) Date: Nov. 12, 2014

(87) PCT Pub. No.: WO2013/186029
PCT Pub. Date: Dec. 19, 2013

(65) Prior Publication Data
US 2015/0096131 A1    Apr. 9, 2015

(30) Foreign Application Priority Data
Jun. 15, 2012 (EP) .................. 12172247

(51) Int. Cl.
| | |
|---|---|
| *C09B 62/02* | (2006.01) |
| *C09B 62/80* | (2006.01) |
| *C09B 62/44* | (2006.01) |
| *C09B 62/825* | (2006.01) |
| *C09B 62/83* | (2006.01) |
| *C09B 62/835* | (2006.01) |
| *C09B 62/84* | (2006.01) |

(52) U.S. Cl.
CPC .............. *C09B 62/80* (2013.01); *C09B 62/4405* (2013.01); *C09B 62/4407* (2013.01); *C09B 62/4409* (2013.01); *C09B 62/4413* (2013.01); *C09B 62/4415* (2013.01); *C09B 62/4416* (2013.01); *C09B 62/4418* (2013.01); *C09B 62/825* (2013.01); *C09B 62/83* (2013.01); *C09B 62/835* (2013.01); *C09B 62/84* (2013.01)

(58) Field of Classification Search
CPC ........ C09B 62/80; C09B 62/83; C09B 62/84; C09B 62/825; C09B 62/835
USPC ............................................ 8/549
See application file for complete search history.

(56) References Cited

U.S. PATENT DOCUMENTS 4,378,313 A * 3/1983 Kayane et al. ............... 534/638

FOREIGN PATENT DOCUMENTS

| | | |
|---|---|---|
| CN | 100 412 140 | 8/2008 |
| CN | 100 434 484 | 11/2008 |
| DE | 38 00 690 | 7/1989 |
| EP | 0 022 265 | 1/1981 |

OTHER PUBLICATIONS

STIC Search Report dated Feb. 25, 2015.*
Fujioka, Seigo, et al.; "Development of Novel Reactive Dyes With a Mixed Bifunctional Reactive System"; Dyes and Pigments, Elsevier Applied Science Publishers; vol. 3; pp. 281-294; Jan. 1, 1982.
Heyna, J; "Reaktivfarbstoffe mit Vinylsulfongruppen"; Angew. Chem; vol. 74 No. 24; pp. 966-969; 1962.

* cited by examiner

*Primary Examiner* — Eisa Elhilo

(57) ABSTRACT

Reactive dyes of formula (1) wherein $Q_1$ and $Q_2$ are each independently of the other hydrogen or unsubstituted or substituted $C_1$-$C_4$alkyl, A is the radical of a monoazo, polyazo, metal complex azo, anthraquinone, phthalocyanine, formazan or dioxazine chromophore, X is halogen, 3- or 4-carboxypyridin-1-yl, or 3- or 4-carbamoylpyridin-1-yl, Y is vinyl or a radical —$CH_2$—$CH_2$—U and U is a group removable under alkaline conditions, and q is the number 1 or 2, are suitable for dyeing and printing cellulosic or amide-group-containing fiber materials.

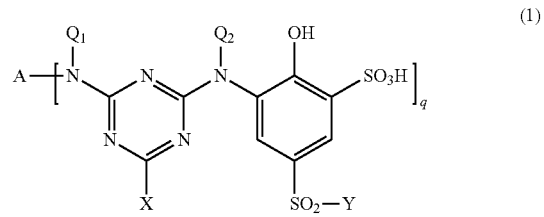

(1)

12 Claims, No Drawings

FIBRE-REACTIVE DYES, THEIR PREPARATION AND THEIR USE

CROSS REFERENCE TO RELATED APPLICATIONS

This application is the National Phase of International Application PCT/EP2013/060759 filed May 24, 2013 which designated the U.S. and which claims priority to European Pat. App. No. 12172247.4 filed Jun. 15, 2012. The noted applications are incorporated herein by reference.

The present invention relates to fibre-reactive dyes, to processes for the preparation thereof and to the use thereof in dyeing or printing textile fibre materials.

The practice of dyeing and printing using reactive dyes has recently led to higher demands being made of the quality of the prints and the profitability of the dyeing and printing process. As a result, there is still a need for novel reactive dyes having improved properties, especially in respect of their application.

Nowadays reactive dyes are required that have sufficient substantivity and at the same time have good ease of washing off of unfixed dye. They should also have a good tinctorial yield and high reactivity, the objective being to provide especially dyeings and prints having high degrees of fixing. The known dyes do not satisfy these requirements in all properties.

The problem underlying the present invention is accordingly to find, for the dyeing or printing of fibre materials, novel improved reactive dyes having the qualities characterised above to a high degree. The novel dyes should especially be distinguished by good build-up behaviour, high fixing yields and high fibre-dye binding stability; it should also be possible for dye that is not fixed to the fibre to be washed off easily. The dyes should also yield dyeings and prints having good all-round fastness properties, for example light-fastness and wet-fastness properties.

It has been shown that the problem posed is largely solved by the novel dyes defined below.

The present invention accordingly relates to reactive dyes of formula (1)

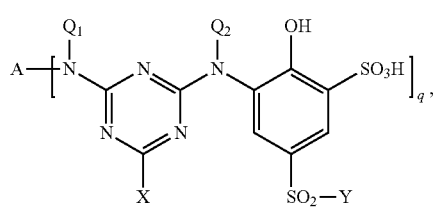

(1)

wherein
$Q_1$ and $Q_2$ are each independently of the other hydrogen or unsubstituted or substituted $C_1$-$C_4$alkyl,
A is the radical of a monoazo, polyazo, metal complex azo, anthraquinone, phthalocyanine, formazan or dioxazine chromophore,
X is halogen, 3- or 4-carboxypyridin-1-yl, or 3- or 4-carbamoylpyridin-1-yl,
Y is vinyl or a radical —CH$_2$—CH$_2$—U and U is a group removable under alkaline conditions, and
q is the number 1 or 2.

$C_1$-$C_4$alkyl radicals $Q_1$ and $Q_2$ are straight-chained or branched. The alkyl radicals may be further substituted, for example by hydroxy, sulfo, sulfato, cyano or by carboxy. The following radicals may be mentioned as examples: methyl, ethyl, n-propyl, isopropyl, n-butyl, isobutyl, sec-butyl and tert-butyl, and also the corresponding radicals substituted by hydroxy, sulfo, sulfato, cyano or by carboxy. Preference is given to hydroxy, sulfo, sulfato or carboxy as substituents. Special preference is given to hydroxy or sulfato as substituent.

Preferably, $Q_1$ and $Q_2$ are each independently of the other hydrogen or $C_1$-$C_4$alkyl, especially hydrogen, methyl or ethyl, the alkyl radicals being unsubstituted or substituted by hydroxy, sulfo, sulfato or by carboxy; more especially, $Q_1$ is hydrogen, and $Q_2$ is hydrogen, methyl or ethyl.

Very especially, $Q_1$ and $Q_2$ are hydrogen.

X as halogen is, for example, fluorine, chlorine or bromine, and especially chlorine or fluorine.

Preferably, X is halogen, and especially chlorine or fluorine.

As a group removable under alkaline conditions, U may be, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$-C$_4$alkyl or —OSO$_2$—N(C$_1$-C$_4$alkyl)$_2$. U is preferably a group of formula —Cl, —OSO$_3$H, —SSO$_3$H, —OCO—CH$_3$, —OCO—C$_6$H$_5$ or —OPO$_3$H$_2$, especially —Cl or —OSO$_3$H, and more especially —OSO$_3$H.

Examples of suitable radicals Y are accordingly vinyl, β-bromo- or β-chloro-ethyl, β-acetoxy-ethyl, β-benzoyloxy-ethyl, β-phosphatoethyl, β-sulfatoethyl and β-thiosulfatoethyl. Y in the dye of formula (1) according to the present invention is preferably vinyl, β-chloroethyl or β-sulfatoethyl, and especially vinyl or β-sulfatoethyl.

Preferably, q is the number 1.

A is, for example, one of the following dye radicals:

a) dye radicals of a 1:1 copper complex azo dye, of the benzene or naphthalene series, wherein the copper atom is bonded to a group capable of being metallated on either side in the ortho-position to the azo bridge;

b) dye radicals of a mono- or dis-azo dye of formula (2) or (3)

or

or of a metal complex derived therefrom, wherein $P_1$ is the radical of a diazo- or coupling component of the benzene or naphthalene series, M is the radical of a central component of the benzene or naphthalene series, $K_1$ is the radical of a coupling component of the benzene, naphthalene, pyrazolone, 6-hydroxypyrid-2-one or acetoacetic acid arylamide series, and u is a number 0 or 1, wherein $P_1$, $D_1$, M and $K_1$ may carry substituents customary for azo dyes;

c) dye radicals of a disazo dye of formula (4)

wherein $D_2$ and $D_3$ are each independently of the other the radical of a diazo component of the benzene or naphthalene series, and $K_2$ is the radical of a coupling component of the naphthalene series, wherein $D_2$, $D_3$ and $K_2$ may carry substituents customary for azo dyes;

d) dye radicals of a formazan dye of formula (5)

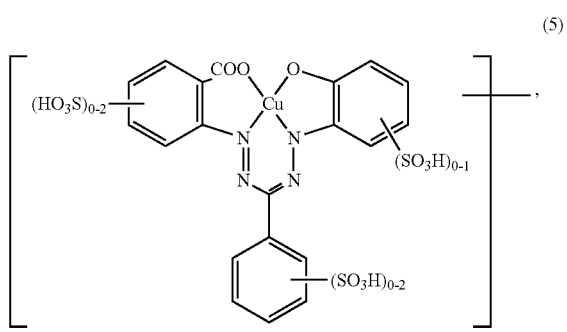

wherein the benzene rings contain no further substituents or are further substituted by $C_1$-$C_4$alkyl, $C_1$-$C_4$alkoxy, $C_1$-$C_4$alkylsulfonyl, halogen or by carboxy;

e) dye radicals of an anthraquinone dye of formula (6)

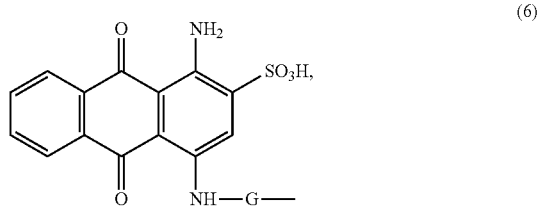

wherein G is a phenylene radical unsubstituted or substituted by $C_1$-$C_4$alkyl, $C_1$-$C_4$alkoxy, halogen, carboxy or by sulfo or is a cyclohexylene, phenylenemethylene or $C_2$-$C_6$alkylene radical;

f) dye radicals of a phthalocyanine dye of formula (7)

wherein Pc is the radical of a metal phthalocyanine, especially the radical of a copper or nickel phthalocyanine, J is —OH and/or —$NQ_4Q_5$, $Q_4$ and $Q_5$ are each independently of the other hydrogen or $C_1$-$C_4$alkyl unsubstituted or substituted by hydroxy or by sulfo, $Q_3$ is hydrogen or $C_1$-$C_4$alkyl, E is a phenylene radical unsubstituted or substituted by $C_1$-$C_4$alkyl, halogen, carboxy or by sulfo or is a $C_2$-$C_6$alkylene radical, and k is from 1 to 3;

g) dye radicals of a dioxazine dye of formula (8a), (8b) or (8c)

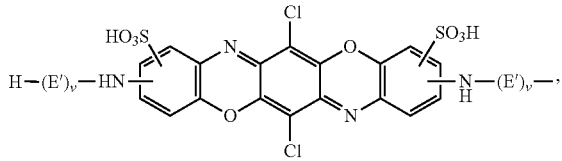

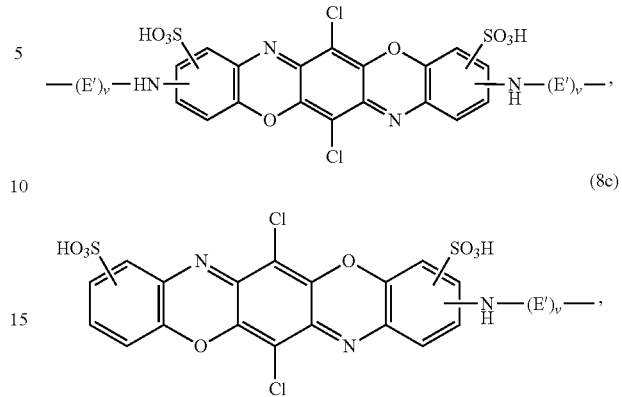

wherein E' is a phenylene radical unsubstituted or substituted by $C_1$-$C_4$alkyl, halogen, carboxy or by sulfo or is a $C_2$-$C_6$alkylene radical, v is the number 1, v' is the number 0 or 1, and the outer benzene rings in formula (8a), (8b) and (8c) may be further substituted by $C_1$-$C_4$alkyl, $C_1$-$C_4$alkoxy, acetylamino, nitro, halogen, carboxy, sulfo or by a fibre-reactive radical of formula —$SO_2$—Y, Y being as defined above and having the preferred meanings given above.

The expression "substituents customary for azo dyes" is intended to include both fibre-reactive and non-fibre-reactive substituents.

The following non-fibre-reactive substituents may be mentioned by way of example: $C_1$-$C_4$-alkyl, which is to be understood as being methyl, ethyl, n- or iso-propyl, and n-, iso-, sec- or tert-butyl; $C_1$-$C_4$alkoxy, which is to be understood as being methoxy, ethoxy, n- or iso-propoxy, and n-, iso-, sec- or tert-butoxy; hydroxy-$C_1$-$C_4$alkoxy; phenoxy; $C_2$-$C_6$alkanoylamino unsubstituted or substituted in the alkyl moiety by hydroxy or by $C_1$-$C_4$alkoxy, e.g. acetylamino, hydroxyacetylamino, methoxyacetylamino or propionylamino; benzoylamino unsubstituted or substituted in the phenyl moiety by hydroxy, sulfo, halogen, $C_1$-$C_4$alkyl or by $C_1$-$C_4$alkoxy; $C_1$-$C_6$alkoxycarbonylamino unsubstituted or substituted in the alkyl moiety by hydroxy, $C_1$-$C_4$alkyl or by $C_1$-$C_4$alkoxy; phenoxycarbonylamino unsubstituted or substituted in the phenyl moiety by hydroxy, $C_1$-$C_4$alkyl or by $C_1$-$C_4$alkoxy; amino; N—$C_1$-$C_4$alkyl- or N,N-di-$C_1$-$C_4$alkyl-amino unsubstituted or substituted in the alkyl moiety by hydroxy, $C_1$-$C_4$alkoxy, carboxy, cyano, halogen, sulfo, sulfato, phenyl or by sulfophenyl, e.g. methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfatoethylamino, N-ethyl-N-(3-sulfobenzyl)-amino, N—(β-sulfoethyl)-N-benzylamino; cyclohexylamino; N-phenylamino or N—$C_1$-$C_4$alkyl-N-phenylamino unsubstituted or substituted in the phenyl moiety by nitro, $C_1$-$C_4$alkyl, $C_1$-$C_4$alkoxy, carboxy, halogen or by sulfo; $C_1$-$C_4$alkoxycarbonyl, e.g. methoxy- or ethoxy-carbonyl; trifluoromethyl; nitro; cyano; halogen, which is to be understood generally as being, for example, fluorine, bromine or, especially, chlorine; ureido; hydroxy; carboxy; sulfo; sulfomethyl; carbamoyl; carbamido; sulfamoyl; N-phenylsulfamoyl or N—$C_1$-$C_4$alkyl-N-phenylsulfamoyl unsubstituted or substituted in the phenyl moiety by sulfo or by carboxy; methyl- or ethyl-sulfonyl.

Fibre-reactive radicals are to be understood as being those which are capable of reacting with the hydroxy groups of cellulose, with the amino, carboxy, hydroxy and thiol groups in wool and silk or with the amino and possibly carboxy groups of synthetic polyamides to form covalent chemical bonds. The fibre-reactive radicals are generally bonded to the dye radical directly or via a bridging member. Suitable fibre-reactive radicals are, for example, those having at least one removable substituent at an aliphatic, aromatic or heterocyclic radical or those wherein the mentioned radicals contain a radical suitable for reaction with the fibre material, for example a vinyl radical.

A fibre-reactive substituent present in A corresponds, for example, to formula (9a), (9b), (9c), (9d), (9e), (9f) or (9g)

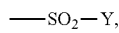     (9a)
—SO$_2$—Y,

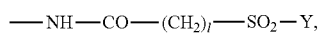     (9b)
—NH—CO—(CH$_2$)$_l$—SO$_2$—Y,

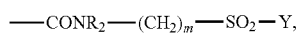     (9c)
—CONR$_2$—(CH$_2$)$_m$—SO$_2$—Y,

     (9d)
—NH—CO—CH(Hal)—CH$_2$—Hal,

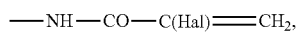     (9e)
—NH—CO—C(Hal)=CH$_2$,

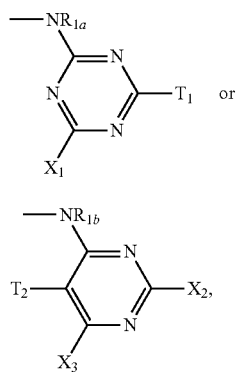

(9f) and (9g)

wherein
Hal is chlorine or bromine,
X$_1$ is halogen, 3- or 4-carboxypyridin-1-yl, or 3- or 4-carbamoylpyridin-1-yl,
T$_1$ has independently the same definitions as X$_1$, or is a non-fibre-reactive substituent or a fibre-reactive radical of formula (10a), (10b), (10c), (10d), (10e) or (10f)

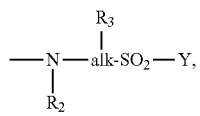     (10a)
—N(R$_2$)—alk-SO$_2$—Y (with R$_3$ on alk),

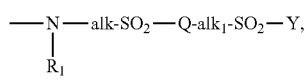     (10b)
—N(R$_1$)—alk-SO$_2$—Q-alk$_1$-SO$_2$—Y,

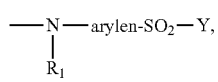     (10c)
—N(R$_1$)—arylen-SO$_2$—Y,

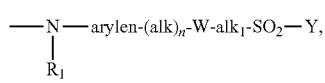     (10d)
—N(R$_1$)—arylen-(alk)$_n$-W-alk$_1$-SO$_2$—Y,

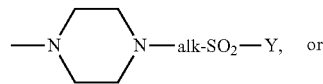     (10e)

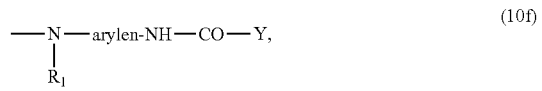     (10f)
—N(R$_1$)—arylen-NH—CO—Y, wherein
R$_1$, R$_{1a}$ and R$_{1b}$ are each independently of the others hydrogen or C$_1$-C$_4$alkyl,
R$_2$ is hydrogen, C$_1$-C$_4$alkyl unsubstituted or substituted by hydroxy, sulfo, sulfato, carboxy or by cyano, or a radical —alk-SO$_2$—Y (with R$_3$), R$_3$ is hydrogen, hydroxy, sulfo, sulfato, carboxy, cyano, halogen, C$_1$-C$_4$alkoxycarbonyl, C$_1$-C$_4$alkanoyloxy, carbamoyl or a group —SO$_2$—Y,
alk and alk$_1$ are each independently of the other linear or branched C$_1$-C$_6$alkylene,
arylene is a phenylene or naphthylene radical unsubstituted or substituted by sulfo, carboxy, C$_1$-C$_4$alkyl, C$_1$-C$_4$alkoxy or by halogen,
Q is a radical —O— or —NR$_1$— wherein R$_1$ is as defined above,
W is a group —SO$_2$—NR$_2$—, —CONR$_2$— or —NR$_2$CO— wherein R$_2$ is as defined above,
Y being as defined above and having the preferred meanings given above,
Y$_1$ is a group —CH(Hal)-CH$_2$—Hal or —C(Hal)=CH$_2$ and Hal is chlorine or bromine, and
l and m are each independently of the other an integer from 1 to 6 and n is a number 0 or 1, and
X$_2$ is halogen or C$_1$-C$_4$alkylsulfonyl,
X$_3$ is halogen or C$_1$-C$_4$alkyl, and
T$_2$ is hydrogen, cyano or halogen.

R$_1$, R$_{1a}$ and R$_{1b}$ preferably are each independently of the others hydrogen, methyl or ethyl, and especially hydrogen.

R$_2$ is preferably hydrogen or C$_1$-C$_4$alkyl, for example methyl, ethyl, propyl, isopropyl, butyl, isobutyl, sec-butyl or tert-butyl, and especially hydrogen, methyl or ethyl. R$_2$ is more especially hydrogen.

R$_3$ is preferably hydrogen.

In the case of the substituents of formulae (9a) and (9c), Y is preferably vinyl or β-sulfatoethyl. In the case of the substituent of formulae (9b), Y is preferably β-chloroethyl.

l and m preferably are each independently of the other a number 2, 3 or 4, and especially a number 2 or 3.

More especially, l is the number 3 and m is the number 2.

For a non-fibre-reactive substituent T$_1$ there come into consideration, for example, hydroxy or C$_1$-C$_4$alkoxy unsubstituted or substituted in the alkyl moiety, phenoxy unsubstituted or substituted in the phenyl moiety, C$_1$-C$_4$alkylthio unsubstituted or substituted in the alkyl moiety, unsubstituted or substituted amino, or an N-heterocycle which may or may not contain further hetero atoms.

T$_1$ as a non-fibre-reactive radical is preferably C$_1$-C$_4$alkoxy, C$_1$-C$_4$alkylthio, hydroxy, amino; N-mono- or N,N-di-C$_1$-C$_4$alkylamino unsubstituted or substituted in the alkyl moiety by hydroxy, sulfato or by sulfo; morpholino; or phenylamino or N—C$_1$-C$_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy; or naphthylamino unsubstituted or substituted by from 1 to 3 sulfo groups.

Especially preferred non-fibre-reactive radicals $T_1$ are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, morpholino, 2-, 3- or 4-carboxyphenylamino, 2-, 3- or 4-sulfophenylamino or N—$C_1$-$C_4$alkyl-N-phenylamino.

$X_1$ is preferably halogen, for example fluorine, chlorine or bromine and especially chlorine or fluorine.

$T_2$, $X_2$ and $X_3$ as halogen are, for example, fluorine, chlorine or bromine, especially chlorine or fluorine.

$X_2$ as $C_1$-$C_4$alkylsulfonyl is, for example, ethylsulfonyl or methylsulfonyl and especially methylsulfonyl.

$X_3$ as $C_1$-$C_4$alkyl is, for example, methyl, ethyl, n- or isopropyl, n-, iso- or tert-butyl and especially methyl.

$X_2$ and $X_3$ are preferably each independently of the other chlorine or fluorine.

$T_2$ is preferably cyano or chlorine.

Hal is preferably bromine.

alk and $alk_1$ are each independently of the other, for example, a methylene, ethylene, 1,3-propylene, 1,4-butylene, 1,5-pentylene or 1,6-hexylene radical or a branched isomer thereof.

alk and $alk_1$ are preferably each independently of the other a $C_1$-$C_4$alkylene radical and especially an ethylene radical or propylene radical.

arylen is preferably a 1,3- or 1,4-phenylene radical unsubstituted or substituted, for example, by sulfo, methyl, methoxy or by carboxy, and especially an unsubstituted 1,3- or 1,4-phenylene radical.

Q is preferably —NH— or —O— and especially —O—.

W is preferably a group of formula —CONH— or —NHCO—, especially a group of formula —CONH—.

n is preferably the number 0.

The reactive radicals of formulae (10a) to (10f) are preferably those wherein W is a group of formula —CONH—, $R_1$, $R_2$ and $R_3$ are each hydrogen, Q is a radical —O— or —NH—, alk and $alk_1$ are each independently of the other ethylene or propylene, arylene is phenylene unsubstituted or substituted by methyl, methoxy, carboxy or by sulfo, Y is vinyl or ß-sulfatoethyl, $Y_1$ is —CHBr—$CH_2$Br or —CBr=$CH_2$ and n is the number 0.

A fibre-reactive radical present in A corresponds preferably to a radical of formula (9a), (9b), (9c), (9d), (9e) or (9f), especially (9a), (9b) or (9f), and especially preferred (9a) or (9b),
wherein
Y is vinyl, β-chloroethyl or β-sulfatoethyl,
Hal is bromine,
$R_2$ and $R_{1a}$ are hydrogen,
m and l are a number 2 or 3,
$X_1$ is chlorine or fluorine,
$T_1$ is $C_1$-$C_4$alkoxy, $C_1$-$C_4$alkylthio, hydroxy, amino; N-mono- or N,N-di-$C_1$-$C_4$alkylamino unsubstituted or substituted in the alkyl moiety by hydroxy, sulfato or by sulfo; morpholino; or phenylamino or N—$C_1$-$C_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy; or naphthylamino unsubstituted or substituted by from 1 to 3 sulfo groups, or is a fibre-reactive radical of formula (10a'), (10b'), (10c'), (10d') or (10f')

(10a')

(10b')

(10c')

(10d')

(10f')

preferably a fibre-reactive radical of formula (10b') or (10c'), wherein

Y is as defined above, $Y_1$ is a group —CH(Br)—$CH_2$—Br or —C(Br)=$CH_2$,

Me is methyl, and Et is ethyl, and the nitrogen atom in formula (10c') is substituted by hydrogen, methyl or ethyl, preferably hydrogen or ethyl.

In the case of the radicals of formulae (10a') and (10b'), Y is preferably β-chloroethyl. In the case of the radicals of formulae (10c') and (10d'), Y is preferably vinyl or β-sulfatoethyl.

In one embodiment of the present invention A is a radical of a mono-azo dye of the formula (2a), (2b), (2c), (2d), (2e), (2f), (2g), (2h), (2i) or (2j)

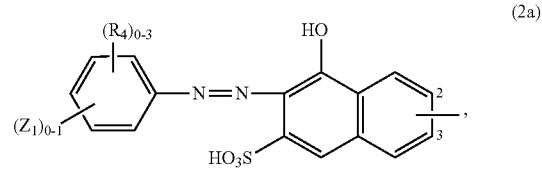
(2a)

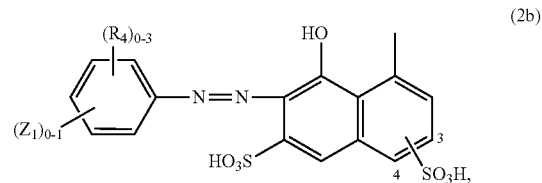
(2b)

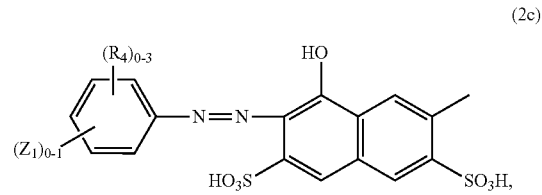
(2c)

-continued

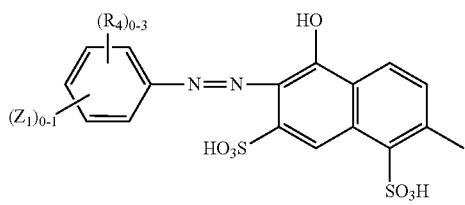
(2d)

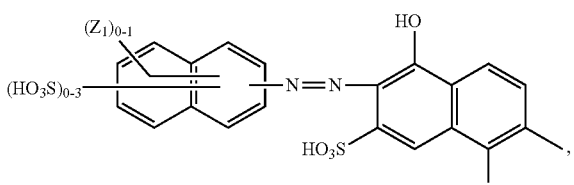
(2h)

wherein $(R_4)_{0-3}$ denotes from 0 to 3 identical or different substituents from the group $C_1$-$C_4$alkyl, $C_1$-$C_4$alkoxy, halogen, carboxy and sulfo, and $Z_1$ is a fibre-reactive radical of formula (9a), (9b), (9c), (9d), (9e) or (9f), preferably (9a), (9b) or (9f) and especially (9a) or (9b), the mentioned fibre-reactive radicals having the definitions and preferred meanings given above,

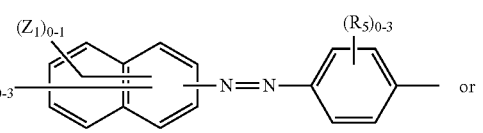
(2i)

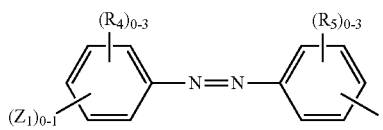
(2j)

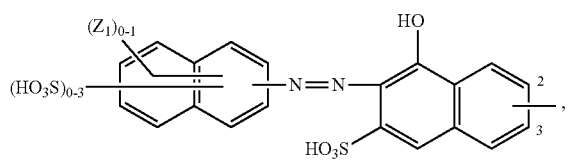
(2e)

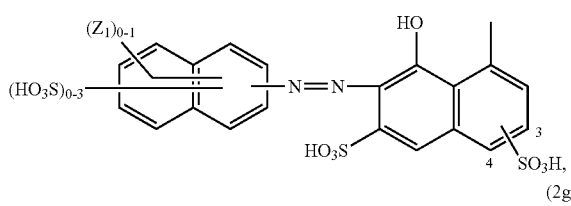
(2f)

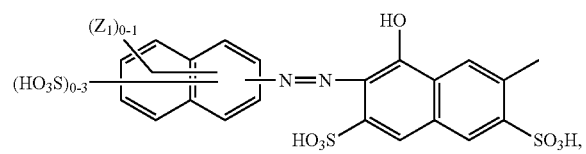
(2g)

wherein $(R_4)_{0-3}$ is as defined above, $(R_5)_{0-3}$ denotes from 0 to 3 identical or different substituents from the group halogen, nitro, cyano, trifluoromethyl, sulfamoyl, carbamoyl, $C_1$-$C_4$alkyl; $C_1$-$C_4$alkoxy unsubstituted or substituted by hydroxy, sulfato or by $C_1$-$C_4$alkoxy; amino, $C_2$-$C_4$alkanoylamino, ureido, hydroxy, carboxy, sulfomethyl, $C_1$-$C_4$alkylsulfonylamino, sulfo and a fibre-reactive radical of the formulae (9b) and (9f), wherein the radicals $R_{1a}$, Y, $T_1$, $X_1$ and l are as defined above and have the preferred meanings given above, and $Z_1$ is as defined above and has the preferred meanings given above.

The numbers on the naphthyl rings of the radicals of formulae (2a), (2b), (2e) and (2f) indicate the possible bonding positions.

In another embodiment of the present invention A is a radical of a mono- or dis-azo dye of the formula (2k), (2l), (2m), (2n), (2o), (2p), (2q), (2r), (2s), (2t), (2u), (3a), (3b), (3c), (3d), (3e), (3f), (4a), (4b), (4c) or (4d),

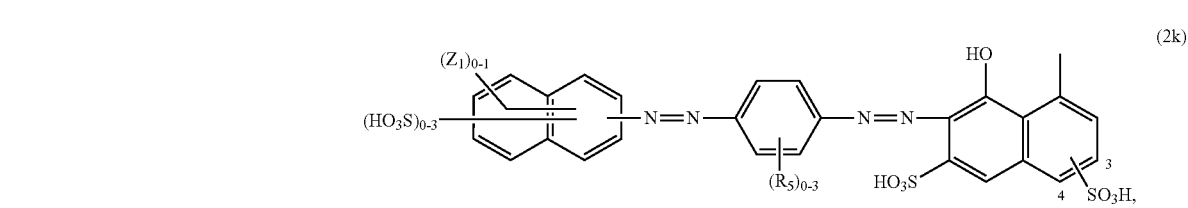
(2k)

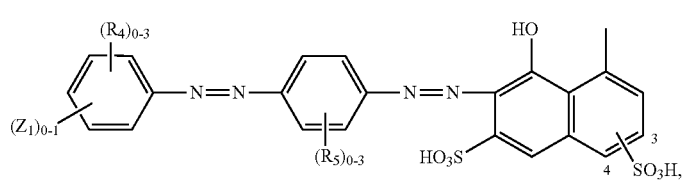
(2l)

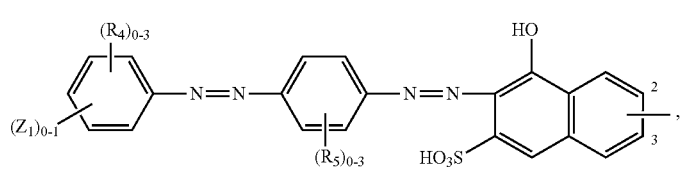
(2m)

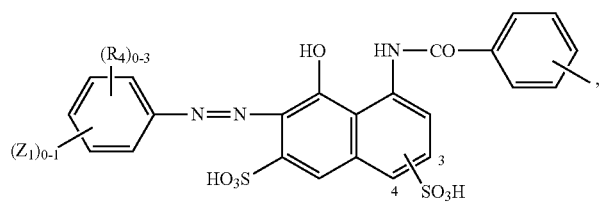
(2n)
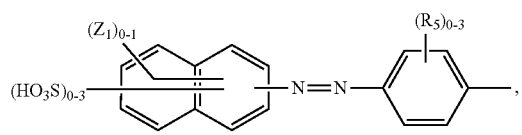
(2o)
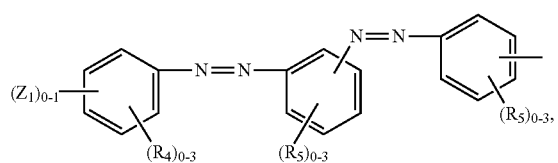
(2p)
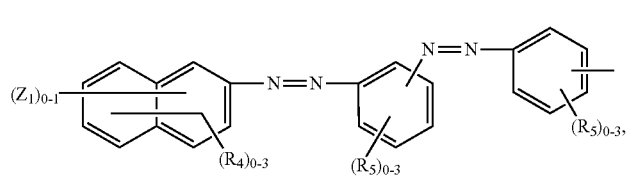
(2q)
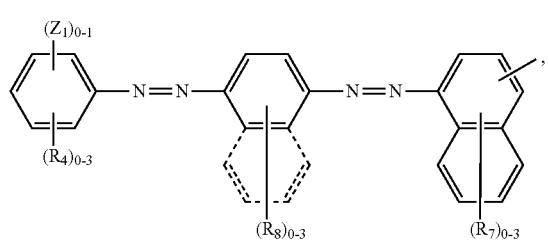
(2r)
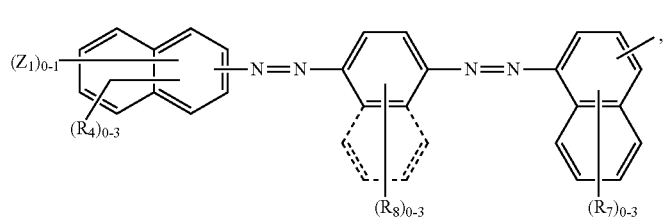
(2s)
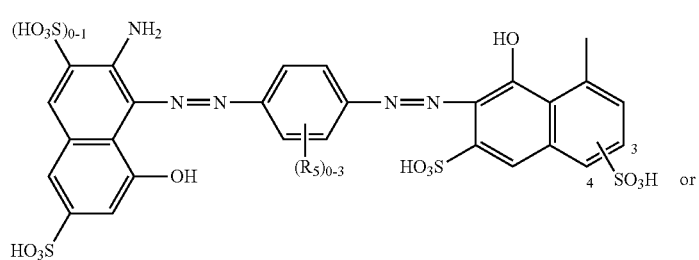
(2t)

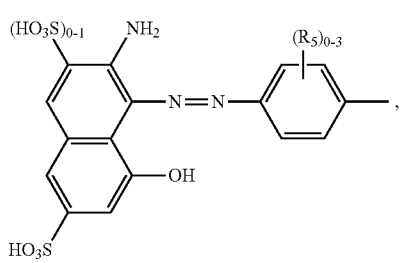

(2u)

wherein $(R_4)_{0-3}$ and $(R_5)_{0-3}$ are as defined above,
$(R_6)_{0-3}$ and $(R_8)_{0-3}$ denote each independently of the other from 0 to 3 identical or different substituents from the group $C_1$-$C_4$alkyl, $C_1$-$C_4$alkoxy, halogen, carboxy and sulfo,
$(R_7)_{0-3}$ denotes from 0 to 3 identical or different substituents from the group $C_1$-$C_4$alkyl, $C_1$-$C_4$alkoxy, halogen, carboxy and sulfo, and
$Z_1$ is as defined above and has the preferred meanings given above,

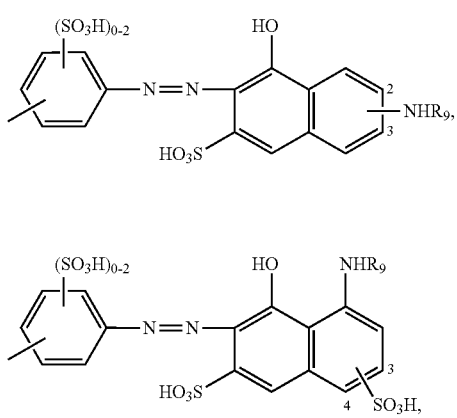

(3a)

(3b)

(3c)

wherein $R_9$ is sulfophenyl, $C_2$-$C_4$alkanoyl, benzoyl or a radical of formula (9b) or (9f) indicated above, wherein the radicals are as defined above and have the preferred meanings given above, preferably $C_2$-$C_4$alkanoyl or benzoyl,

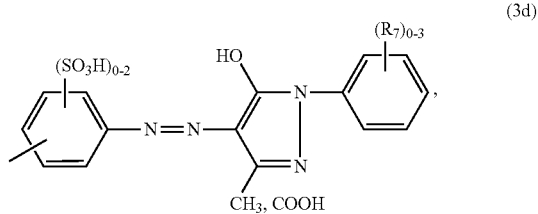

(3d)

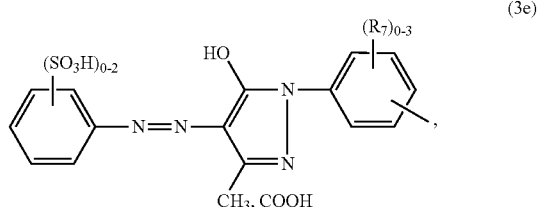

(3e)

wherein $(R_7)_{0-3}$ is as defined above,

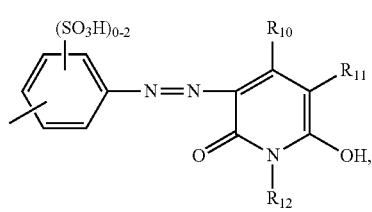

(3f)

wherein $R_{10}$ and $R_{12}$ are each independently of the other hydrogen, $C_1$-$C_4$alkyl or phenyl, and $R_{11}$ is hydrogen, cyano, carbamoyl or sulfomethyl,

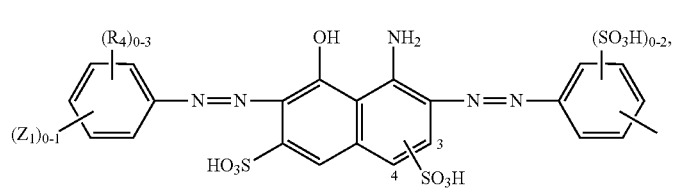

(4a)

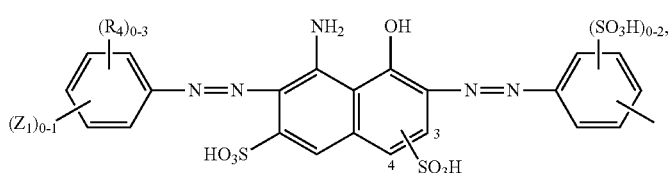

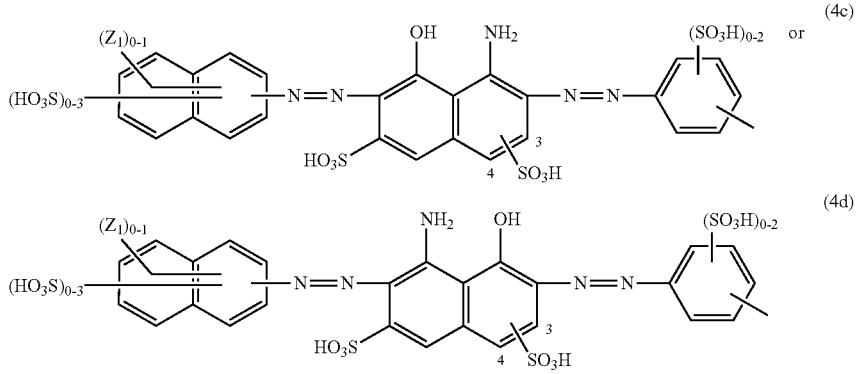

wherein $(R_4)_{0-3}$ and $Z_1$ are in each case as defined above and have the preferred meanings given above.

The numbers on the naphthyl rings of the radicals of formulae (2k), (2l), (2m), (2n), (2t), (3a), (3b), (3c), (4a), (4b), (4c) and (4d) indicate the possible bonding positions.

The central components of the disazo dye radicals of the formulae (2r) and (2s) are either a benzene or a naphthalene group, which is indicated by the dotted lines.

Examples of suitable dye radicals A in the reactive dyes according to the invention are given in U.S. Pat. No. 5,484,899 (columns 13 to 40) and EP-A-0 623 655 (pages 11 to 27).

In an especially preferred embodiment of the dyes according to the invention, A is a dye radical of the formula (2a), (2b), (2c), (2d), (2e), (2f), (2g), (2h), (2i), (2j) or (6) especially (2b), (2f), (2i), (2j) or (6), wherein $(R_4)_{0-3}$, $(R_5)_{0-3}$, G and $Z_1$ are in each case as defined above, and $(R_4)_{0-3}$ preferably denotes from 0 to 3 identical or different substituents from the group methyl, methoxy and sulfo, $(R_5)_{0-3}$ preferably denotes from 0 to 3, especially 0 to 2, identical or different substituents from the group methyl, methoxy, β-hydroxyetoxy, β-sulfatoethoxy, sulfo, acetylamino, ureido, and a fibre-reactive radical of the formulae (9b), G preferably is a phenylene radical unsubstituted or substituted by $C_1$-$C_4$alkyl, $C_1$-$C_4$alkoxy or by sulfo, $Z_1$ preferably may, if desired, be a fibre-reactive radical of formula (9a) or (9b), wherein Y and l are as defined above and have the preferred meanings given above.

In a further especially preferred embodiment of the reactive dyes according to the invention, A is a dye radical of formula (2k), (2l), (2m), (4a), (4b), (4c) or (4d) indicated above, wherein $(R_4)_{0-3}$, $(R_5)_{0-3}$ and $Z_1$ are in each case as defined above and have the preferred meanings given above.

A preferred embodiment of the present invention relates to reactive dyes of formula (1)
wherein
$Q_1$ and $Q_2$ are hydrogen,
q is the number 1,
X is chlorine or fluorine,
Y is vinyl, β-chloroethyl or β-sulfatoethyl, and
A is a dye radical of the formula (2b), (2f), (2i), (2j) or (6), wherein
$(R_4)_{0-3}$ denotes from 0 to 3 identical or different substituents from the group $C_1$-$C_4$alkyl, $C_1$-$C_4$alkoxy, halogen, carboxy and sulfo, preferably methyl, methoxy and sulfo,
$(R_5)_{0-3}$ denotes from 0 to 3 identical or different substituents from the group halogen, nitro, cyano, trifluoromethyl, sulfamoyl, carbamoyl, $C_1$-$C_4$alkyl; $C_1$-$C_4$alkoxy unsubstituted or substituted by hydroxy, sulfato or by $C_1$-$C_4$alkoxy; amino, $C_2$-$C_4$alkanoylamino, ureido, hydroxy, carboxy, sulfomethyl, $C_1$-$C_4$alkylsulfonylamino, sulfo and a fibre-reactive radical of the formulae (9b) and (9f), preferably denotes from 0 to 2, identical or different substituents from the group methyl, methoxy, β-hydroxyethoxy, β-sulfatoethoxy, sulfo, acetylamino, ureido and a fibre-reactive radical of the formulae (9b),
G is a phenylene radical unsubstituted or substituted by $C_1$-$C_4$alkyl, $C_1$-$C_4$alkoxy or by sulfo,
$Z_1$ is a fibre-reactive radical of formula (9a), (9b) or (9f), especially (9a) or (9b), wherein
Y is as defined above,
$R_{1a}$ is hydrogen,
l is the number 3,
$X_1$ is chlorine or fluorine,
$T_1$ is $C_1$-$C_4$alkoxy, $C_1$-$C_4$alkylthio, hydroxy, amino; N-mono- or N,N-di-$C_1$-$C_4$alkylamino unsubstituted or substituted in the alkyl moiety by hydroxy, sulfato or by sulfo; morpholino; or phenylamino or N—$C_1$-$C_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy; or naphthylamino unsubstituted or substituted by from 1 to 3 sulfo groups, or is a fibre-reactive radical of formula (10a'), (10b'), (10c'), (10d') or (10f'), preferably a fibre-reactive radical of formula (10b') or (10c'), wherein
Y is as defined above,
$Y_1$ is a group —CH(Br)—$CH_2$—Br or —C(Br)=$CH_2$,
Me is methyl, and Et is ethyl, and the nitrogen atom in formula (10c') is substituted by hydrogen, methyl or ethyl, preferably hydrogen or ethyl.

The present invention relates also to a process for the preparation of the reactive dyes of formula (1), wherein q is the number 1, which comprises reacting with one another, in any order, approximately one molar equivalent of an amino dye compound of formula (11a)

or a suitable precursor of the compound of formula (11a), approximately one molar equivalent of a compound of formula (12)

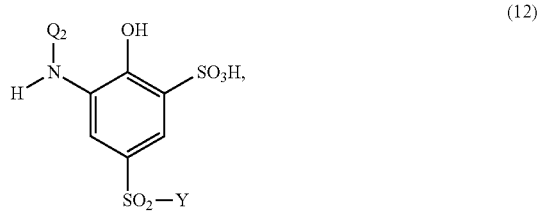

and approximately one molar equivalent of a halotriazine, preferably 2,4,6-trichloro- or 2,4,6-trifluoro-s-triazine; and to a process for the preparation of the reactive dyes of formula (1), wherein q is the number 2, which comprises reacting with one another, in any order, approximately two molar equivalents of an amino dye compound of formula (11b)

or a suitable precursor of the compound of formula (11b), approximately two molar equivalents of a compound of formula (12) as given above, and approximately two molar equivalents of a halotriazine as given above, or, if using precursors of the compound of formula (11a) or (11b), converting the intermediates obtained into the desired dyes and, where appropriate, following on with a further transformation reaction, for example for transformation of a halogen atom on the triazine into any desired radical X; $Q_1$, $Q_2$, A, X and Y in each case being as defined above and having the preferred meanings given above.

The transformation of intermediates, resulting from the use of a precursor of the amino dye of formula (11a) or (11b), into the end dyes consists especially of coupling reactions that result in azo dyes. Coupling to a conventionally diazotised compound is carried out according to methods generally known in the art, for example at a neutral to slightly acidic pH and at a temperature of, for example, 0-20° C. The diazotisation is effected in customary manner, for example using a nitrite, e.g. an alkali metal nitrite, such as sodium nitrite, in an acid medium, for example a hydrochloric-acid-containing medium, at temperatures of, for example, from −5 to 40° C., preferably from −5 to 10° C. and especially from 0 to 5° C.

The halogen atom X on the triazine can be replaced by condensing the compound of formula (1) obtained wherein X is halogen, preferably fluorine or chlorine, with a compound X*—H wherein X*has the meanings given above for X except for halogen.

Such condensation reactions are known and described, for example, in EP-A-0 260 227 and U.S. Pat. No. 4,841,049.

The end product may optionally be subjected to a further transformation reaction. Such a transformation reaction is, for example, conversion of the radical Y having the meaning —CH$_2$CH$_2$—U, wherein U is as defined above, and a reactive group, present in A and capable of conversion into a vinyl group, into the vinyl form by treatment with dilute sodium hydroxide solution, e.g. conversion of the β-sulfatoethylsulfonyl or β-chloroethylsulfonyl group into the vinylsulfonyl radical. Such reactions are known per se.

Because the individual process steps mentioned above may be carried out in different orders as well as, where appropriate in some cases, simultaneously, different process variants are possible. The reaction is generally carried out in stepwise succession, the order of the simple reactions, known per se, between the individual reaction components being determined by the particular conditions.

A preferred variant of the preparation of the dyes according to the invention comprises reacting one molar equivalent of 2,4,6-trichloro- or 2,4,6-trifluoro-s-triazine first with one molar equivalent of a compound of formula (12), if q is the number 1, or reacting two molar equivalents of 2,4,6-trichloro- or 2,4,6-trifluoro-s-triazine first with two molar equivalents of a compound of formula (12), if q is the number 2, at approximately neutral pH, for example pH 5-7, and at low temperature, for example 0-5° C., and then reacting the reaction product of formula (13)

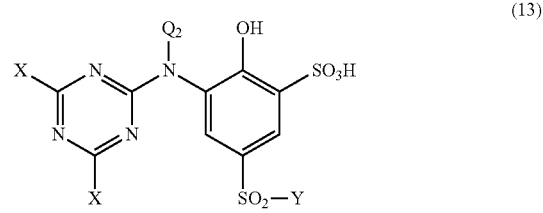

obtained, with one molar equivalent of the amino dye of formula (11a), if q is the number 1, or (11 b), if q is the number 2, at a slightly acidic to neutral pH, for example pH 4.5-6, and at a temperature of, for example 0-30° C., to form the dye of formula (1), wherein $Q_1$, $Q_2$, A, X and Y in each case being as defined above and having the preferred meanings given above and X being chlorine or fluorine.

The compounds of formulae (11a), (11 b) and (12) are known per se, they can be prepared in analogy to known compounds or are commercially available.

The reactive dyes according to the invention are present either in the form of their free acid or, preferably, in the form of their salts. Suitable salts are, for example, alkali metal, alkaline earth metal or ammonium salts or salts of an organic amine. Examples that may be mentioned are sodium, lithium, potassium or ammonium salts or a mono-, di- or tri-ethanolamine salt.

The reactive dyes according to the invention are suitable for dyeing and printing, in particular for printing, a wide variety of materials, especially hydroxyl-group-containing or nitrogen-containing fibre materials. Examples include paper, silk, leather, wool, polyamide fibres and polyurethanes, and especially all types of cellulosic fibre materials. Such fibre materials are, for example, natural cellulose fibres, such as cotton, linen and hemp, and cellulose and regenerated cellulose. The dyes according to the invention are also suitable for dyeing or printing hydroxyl-group-containing fibres present in blend fabrics, for example blends of cotton and polyester fibres or polyamide fibres.

The present invention accordingly relates also to the use of reactive dyes according to the invention in the dyeing or printing of hydroxyl-group-containing or nitrogen-containing, especially cotton-containing, fibre materials.

The reactive dyes according to the invention can be applied to the fibre material and fixed to the fibre in a variety of ways, especially in the form of aqueous dye solutions or dye print pastes. They are suitable both for the exhaust process and for dyeing in accordance with the pad-dyeing process; they can be used at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The reactive dyes according to the invention are also suitable for printing, especially on cotton, and also for printing nitrogen-containing fibres, for example wool or silk or blend fabrics that contain wool.

The dyeings and prints produced using the reactive dyes according to the invention have a high tinctorial strength and a high fibre-dye binding stability in both the acidic and the alkaline range, and also good fastness to light and very good wet-fastness properties, such as fastness to washing, to water, to seawater, to cross-dyeing and to perspiration. The dyeings obtained exhibit fibre levelness and surface levelness.

The dyes of formula (1) according to the invention are also suitable as colorants for use in recording systems. Such recording systems are, for example, commercially available ink-jet printers for paper or textile printing, or writing instruments, such as fountain pens or ballpoint pens, and especially ink-jet printers. For that purpose, the dyes according to the invention are first brought into a form suitable for use in recording systems. A suitable form is, for example, an aqueous ink, which comprises the dyes according to the invention as colorants. The inks can be prepared in customary manner by mixing together the individual components in the desired amount of water.

As substrates there come into consideration the above-mentioned hydroxyl-group-containing or nitrogen-containing fibre materials, especially cotton fibre materials. The fibre materials are preferably textile fibre materials.

Substrates that also come into consideration are paper and plastics films.

As examples of paper there may be mentioned commercially available ink-jet paper, photo paper, glossy paper, plastics-coated paper, e.g. Epson Ink-jet Paper, Epson Photo Paper, Epson Glossy Paper, Epson Glossy Film, HP Special Ink-jet Paper, Encad Photo Gloss Paper and Ilford Photo Paper. Plastics films are, for example, transparent or cloudy/opaque. Suitable plastics films are, for example, 3M Transparency Film.

Depending on the nature of the use, for example textile printing or paper printing, it may be necessary, for example, for the viscosity or other physical properties of the ink, especially properties that have an influence on the affinity for the substrate in question, to be adapted accordingly.

The dyes used in the aqueous inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. The preferred lower limit in this case is a limit of 1.5% by weight, preferably 2% by weight and especially 3% by weight.

The inks may comprise water-miscible organic solvents, for example $C_1$-$C_4$alcohols, e.g. methanol, ethanol, n-propanol, isopropanol, n-butanol, sec-butanol, tert-butanol or iso-butanol; amides, e.g. dimethylformamide or dimethylacetamide; ketones or ketone alcohols, e.g. acetone or diacetone alcohol; ethers, e.g. tetrahydrofuran or dioxane; nitrogen-containing heterocyclic compounds, e.g. N-methyl-2-pyrrolidone or 1,3-dimethyl-2-imidazolidone, polyalkylene glycols, e.g. polyethylene glycol or polypropylene glycol; $C_2$-$C_6$alkylene glycols and thioglycols, e.g. ethylene glycol, propylene glycol, butylene glycol, triethylene glycol, thiodiglycol, hexylene glycol and diethylene glycol; other polyols, e.g. glycerol or 1,2,6-hexanetriol; and $C_1$-$C_4$alkyl ethers of polyhydric alcohols, e.g. 2-methoxy-ethanol, 2-(2-methoxyethoxyl)ethanol, 2-(2-ethoxyethoxyl)ethanol, 2-[2-(2-methoxy-ethoxy)ethoxy]ethanol or 2-[2-(2-ethoxyethoxyl)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

In addition, the inks may also comprise solubilisers, e.g. ε-caprolactam.

The inks may comprise thickeners of natural or synthetic origin, inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methyl cellulose, ethyl cellulose, carboxymethyl cellulose, hydroxyethyl cellulose, methyl hydroxyethyl cellulose, hydroxypropyl cellulose or hydroxypropyl methyl cellulose, especially with preferably from 20 to 25% by weight carboxymethyl cellulose. Synthetic thickeners that may also be mentioned are, for example, those based on poly(meth)acrylic acids or poly(meth)acrylamides and also polyalkylene glycols having a molecular weight of, for example, from 2000 to 20 000, such as, for example, polyethylene glycol or polypropylene glycol or mixed polyalkylene glycols of ethylene oxide and propylene oxide.

The inks contain such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, poly-phosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and more especially from 1 to 10 mPa·s.

Furthermore, the inks may in addition comprise customary additives, e.g. anti-foams or especially preservatives that inhibit fungal and/or bacterial growth. Such additives are usually used in amounts of from 0.01 to 1% by weight, based on the total weight of the ink.

As preservatives there come into consideration formaldehyde-yielding agents, for example paraformaldehyde and trioxane, especially aqueous, approximately from 30 to 40% by weight formaldehyde solutions, imidazole compounds, for example 2-(4-thiazolyl)-benzimidazole, thiazole compounds, for example 1,2-benzisothiazolin-3-one or 2-n-octyl-isothiazolin-3-one, iodine compounds, nitriles, phenols, haloalkylthio compounds or pyridine derivatives, especially 1,2-benzisothiazolin-3-one or 2-n-octyl-isothiazolin-3-one.

A suitable preservative is, for example, a 20% by weight solution of 1,2-benzisothiazolin-3-one in dipropylene glycol (Proxel® GXL).

The inks may in addition comprise further additives, such as fluorinated polymers or telomers, for example polyethoxyperfluoroalcohols (Forafac® or Zonyl® products) in an amount of, for example, from 0.01 to 1% by weight, based on the total weight of the ink.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The present invention accordingly relates also to aqueous inks that comprise the dyes of formula (1) according to the invention and to the use of such inks in an ink-jet printing method for printing a variety of substrates, especially textile fibre materials, the definitions and preferences indicated above applying to the dyes, the inks and the substrates.

The dyes of the present invention show very good build-up behaviour, a high end build-up and a high degree of fixation, especially in printing applications on cellulosic fibre materials.

The following Examples serve to illustrate the invention. Unless otherwise indicated, the temperatures are given in degrees Celsius, parts are parts by weight and percentages relate to percent by weight. Parts by weight relate to parts by volume in a ratio of kilograms to liters.

EXAMPLE 1

(a) 3.76 g (0.0204 mol) of cyanuric chloride are suspended into 40 ml of water and 40 g of ice. The resulting suspension is then cooled to 0-5° C. using an external ice water bath. 5 ml of a 10% aqueous solution of disodiumhydrogenphosphate and 0.5 ml of a conventional dispersing agent (Sandozin NE from Clariant) are then added to the suspension. The resulting suspension is stirred at 0-5° C. until further use.

(b) 7.55 g (0.02 mol) of 2-(2-Amino-6-sulfo-phenol-4-sulfonyl)ethyl sulfate are mixed in 80 ml of water and 60 g of ice. A temperature of 0-5° C. is adjusted and maintained using an external ice water bath. The pH is adjusted to 6.0 by addition of an aqueous sodium hydroxyde solution (30%). The resulting yellowish-brown solution is then stirred at 0-5° C. for 30 minutes.

(c) The solution obtained according to step (b) is added to the cyanuric chloride solution obtained according to step (a) over 30 minutes at a pH of 5.0-6.0 and a temperature of 0-5° C. The pH is maintained at around 5.0-6.0 by addition of an aqueous sodium carbonate solution (20%). After 45 minutes, the first condensation step is completed. The pH is lowered to 4.5 by addition of hydrochloric acid (32%) before submitting the solution to the procedure described in step (e).

(d) 12.0 g (0.02 mol) of the amino formazan dye of formula

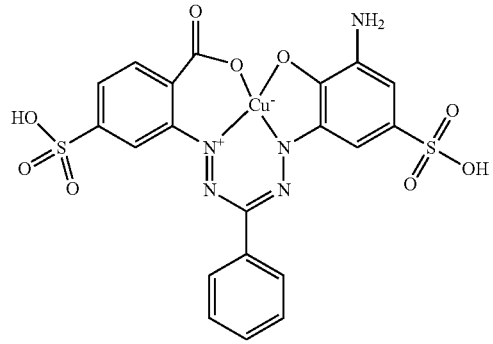

are solubilized in 150 ml of water at 20° C., and at pH 4.5, and stirred until further use.

e) The solution obtained according to step (c) is added to the formazan solution obtained according to step (d) over 30 minutes at 20° C., and at pH 4.5. The pH is kept constant by the addition of hydrochloric acid (32%). After the addition is complete, the resulting solution is heated to 40° C. and stirred at this temperature for 3.5 hours, while the pH is kept constant by means of an aqueous sodium carbonate solution (20%). After completion of the reaction, the reaction mixture is cooled to 20° C. and the pH is adjusted to 7.0 by addition of an aqueous sodium carbonate solution (20%). The solution is submitted to a reverse osmosis for 12 hours and then dried, providing 25.6 g of a dyestuff as a blue powder, which in its free acid form corresponds to the formula (101)

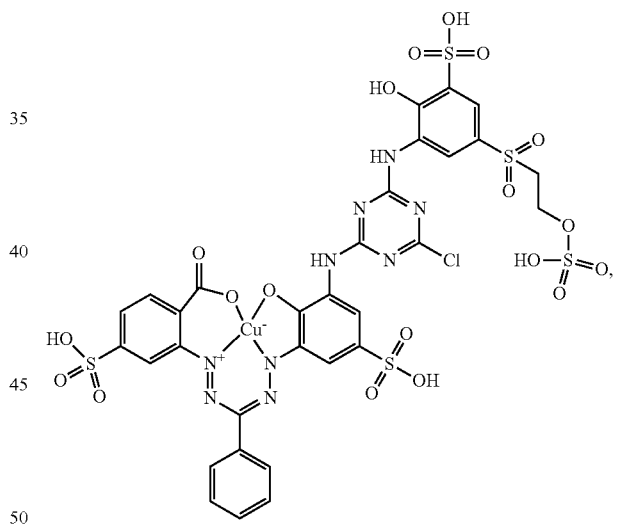

having a $\lambda_{max}$ of 610 nm.

EXAMPLE 2

(a) 6.1 g (0.019 mol) of 1-amino-8-hydroxy-3,6-disulfonaphthalene (H-Acid) are suspended into 100 ml of water at 20° C. The pH is adjusted to 6.0-7.0 by addition of an aqueous sodium hydroxyde solution (30%), and the mixture is then stirred until H-Acid is completely dissolved.

(b) The solution obtained according to step (a) of this Example 2 is added to a solution prepared in accordance with Example 1(c) at pH 2.0 and a temperature of 5-10° C. The pH is then raised slowly to pH 4.0 by addition of an aqueous sodium carbonate solution (20%). Once pH 4 is reached, the temperature is raised to 25-30° C. and the mixture is stirred at this temperature for 6 hours, while the pH is kept constant by addition of an aqueous sodium carbonate solution (20%).

After completion of the reaction, the solution is kept as it is until further use. The pH is raised to 7.0-7.5 by addition of an aqueous sodium carbonate solution (20%), before submitting the solution to the procedure described in step (d).

(c) 6.1 g (0.02 mol) of 1,5-disulfo-2-aminonaphthalene are suspended into 100 ml water and dissolved at pH 2.0 by addition of an aqueous sodium hydroxyde solution (30%). Once dissolved, the pH is lowered below 1.0 by addition of hydrochloric acid (32%), and 30 g of ice are added to cool the mixture to 0-5° C. The temperature is kept constant by using an external ice-water bath. 5.25 ml of sodium nitrite 4 N are added and the mixture is stirred for 30 minutes. After completion of the diazotation reaction, excess of sodium nitrite is destroyed with sulfamic acid.

(d) The solution obtained according to step (b) of this Example 2 is cooled by means of an external ice-water bath, and the pH is adjusted to 7.0-7.5. The ice-water bath is removed and the diazonium salt solution according to step (c) of this Example 2 is added over 20 minutes at about 10° C., while the pH is kept at 7.5-8.0 by addition of an aqueous sodium carbonate solution (20%). The temperature is then allowed to increase to 20° C. After completion of the reaction, the pH is adjusted to 7.0 by addition of hydrochloric acid (32%). The solution is submitted to a reverse osmosis for 12 hours and then dried, providing 25.5 g of a dyestuff as a red powder, which in its free acid form corresponds to the formula

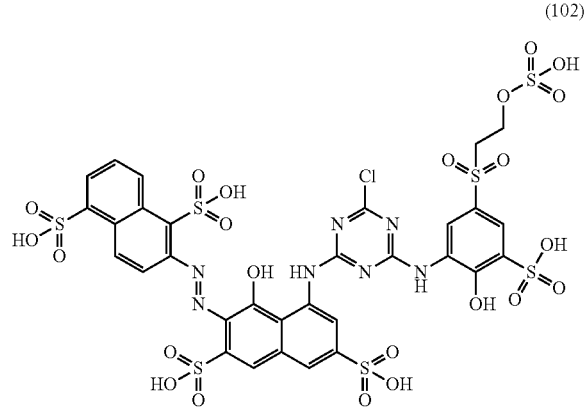 [SMILES: O=S(=O)(O)OCCS(=O)(=O)c1cc(Nc2nc(Cl)nc(Nc3cc(S(=O)(=O)O)cc4cc(S(=O)(=O)O)c(/N=N/c5ccc6c(S(=O)(=O)O)cccc6c5S(=O)(=O)O)c(O)c34)n2)c(O)c(S(=O)(=O)O)c1]

(102)

having a $\lambda_{max}$ of 542/524 nm.

EXAMPLE 3

(a) 11.1 g (0.02 mol) of a amino monoazo dye of formula

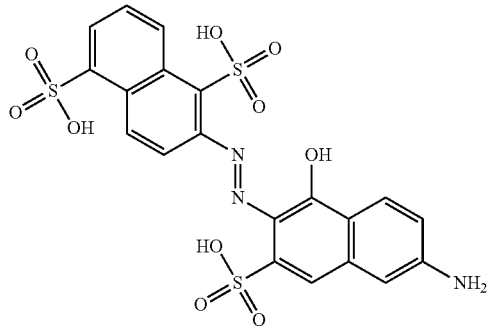 [SMILES: Nc1ccc2c(O)c(/N=N/c3ccc4c(S(=O)(=O)O)cccc4c3S(=O)(=O)O)c(S(=O)(=O)O)cc2c1]

are solubilized in 100 ml of water at 20° C. The pH is adjusted to 4.0-4.5 by addition of an aqueous sodium hydroxyde solution (30%) The orange solution is then stirred until further use.

(b) The solution obtained according to step (a) of this Example 3 is added to a solution prepared in accordance with Example 1(c) at pH 4.0-4.5 and a temperature of 5-10° C. over 15 minutes. After the addition is complete, the temperature is raised to 35-40° C. and the mixture is stirred at this temperature for 5 hours while the pH is kept constant by addition of an aqueous sodium carbonate solution (20%). After completion of the reaction, the solution is cooled to 20° C. and pH is adjusted to 7.0 by addition of an aqueous sodium carbonate solution (20%). The solution is submitted to a reverse osmosis for 12 hours and then dried, providing 27.3 g of a dyestuff as an orange powder, which in its free acid form corresponds to the formula

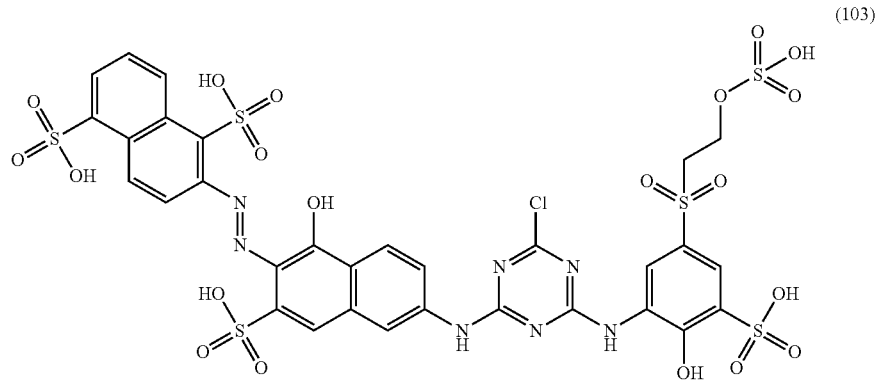 [SMILES: O=S(=O)(O)OCCS(=O)(=O)c1cc(Nc2nc(Cl)nc(Nc3ccc4c(O)c(/N=N/c5ccc6c(S(=O)(=O)O)cccc6c5S(=O)(=O)O)c(S(=O)(=O)O)cc4c3)n2)c(O)c(S(=O)(=O)O)c1]

(103)

having a $\lambda_{max}$ of 486 nm.

EXAMPLES 4 TO 53
The dyestuffs indicated in Table 1 can be prepared analogously to the procedures described in Examples 1, 2 and 3.
TABLE 1
| Example | Structure | Color shade | $\lambda_{max}$ [nm] |
|---|---|---|---|
| 4 | 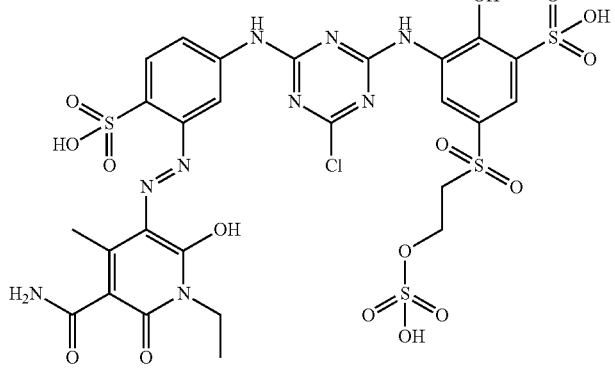 | Lemon Yellow | 422 |
| 5 | 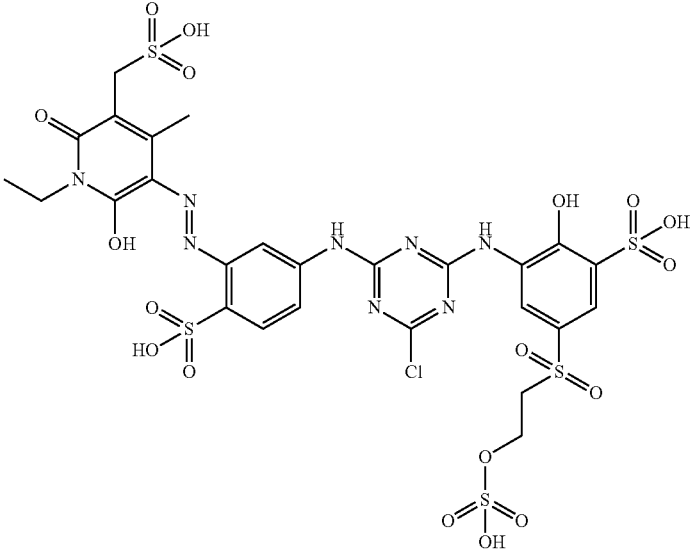 [SMILES: CCn1c(O)c(/N=N/c2cc(Nc3nc(Cl)nc(Nc4cc(S(=O)(=O)CCOS(=O)(=O)O)cc(S(=O)(=O)O)c4O)n3)ccc2S(=O)(=O)O)c(C)c(CS(=O)(=O)O)c1=O] | Lemon yellow | 424 |

TABLE 1-continued
| Example | | Color shade | $\lambda_{max}$ [nm] |
|---|---|---|---|
| 6 | 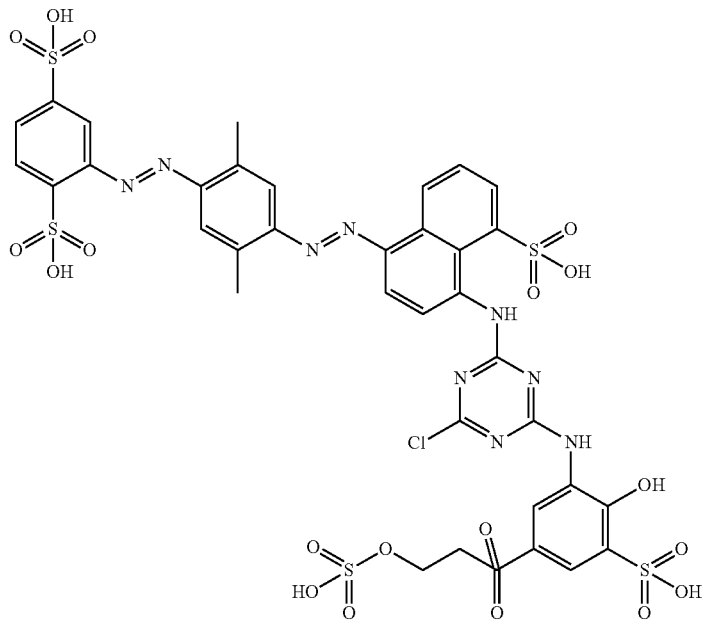 | Orange | 426 |
| 7 | 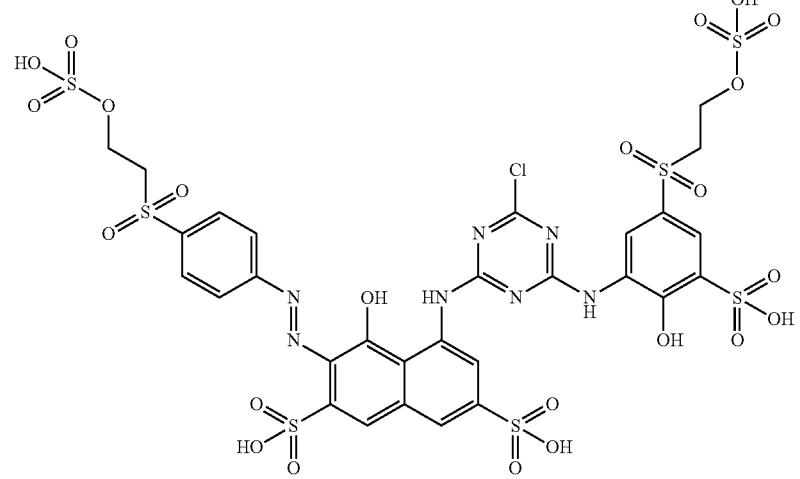 | Red | 520 |
| 8 | 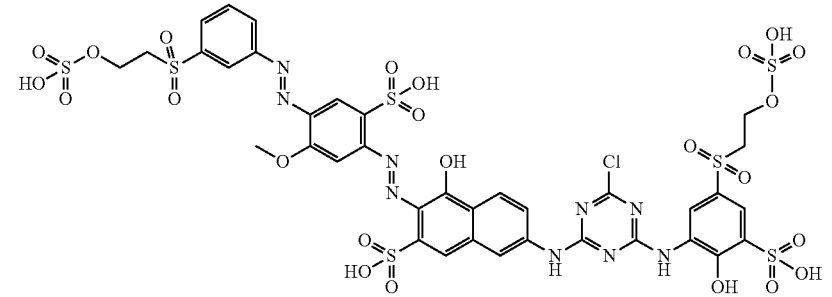 [SMILES: COc1cc(/N=N/c2c(S(=O)(=O)O)cc3cc(Nc4nc(Cl)nc(Nc5cc(S(=O)(=O)CCOS(=O)(=O)O)cc(S(=O)(=O)O)c5O)n4)ccc3c2O)c(S(=O)(=O)O)cc1/N=N/c1cccc(S(=O)(=O)CCOS(=O)(=O)O)c1] | Red | 504 |

TABLE 1-continued
| Example | | Color shade | $\lambda_{max}$ [nm] |
|---|---|---|---|
| 9 | 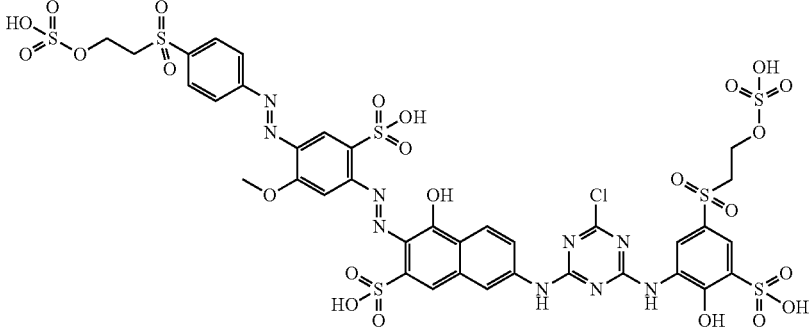 [SMILES: COc1cc(/N=N/c2c(S(=O)(=O)O)cc3cc(Nc4nc(Cl)nc(Nc5cc(S(=O)(=O)CCOS(=O)(=O)O)cc(S(=O)(=O)O)c5O)n4)ccc3c2O)c(S(=O)(=O)O)cc1/N=N/c1ccc(S(=O)(=O)CCOS(=O)(=O)O)cc1] | Red | 510 |
| 10 | 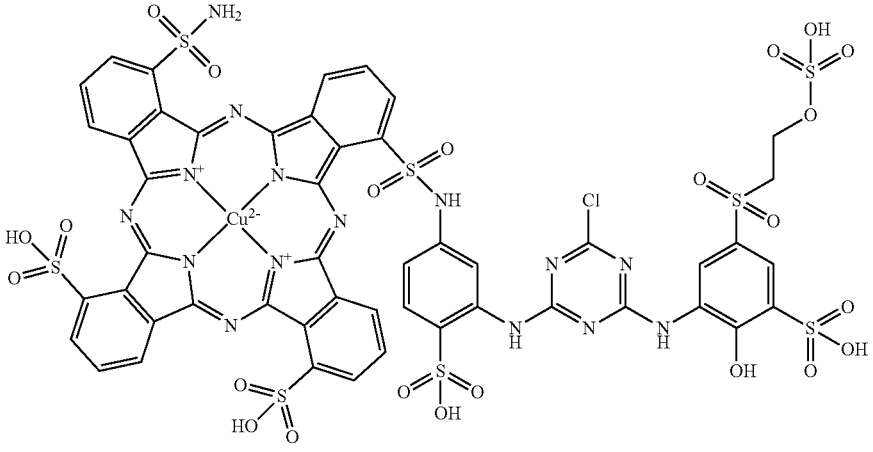 | Turquois | 628/670 |
| 11 | 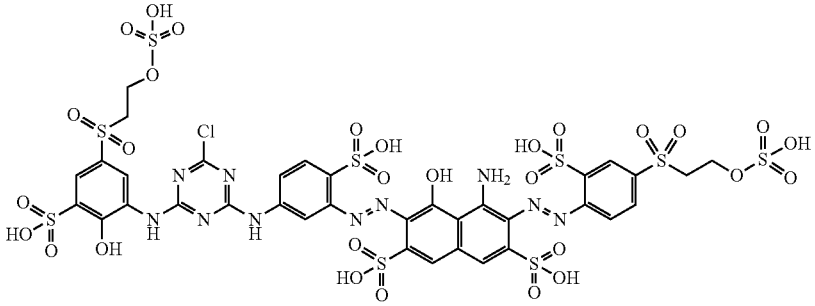 [SMILES: Nc1c(/N=N/c2ccc(S(=O)(=O)CCOS(=O)(=O)O)cc2S(=O)(=O)O)c(S(=O)(=O)O)cc2cc(S(=O)(=O)O)c(/N=N/c3cc(Nc4nc(Cl)nc(Nc5cc(S(=O)(=O)CCOS(=O)(=O)O)cc(S(=O)(=O)O)c5O)n4)ccc3S(=O)(=O)O)c(O)c12] | Navy | 626 |
| 12 | 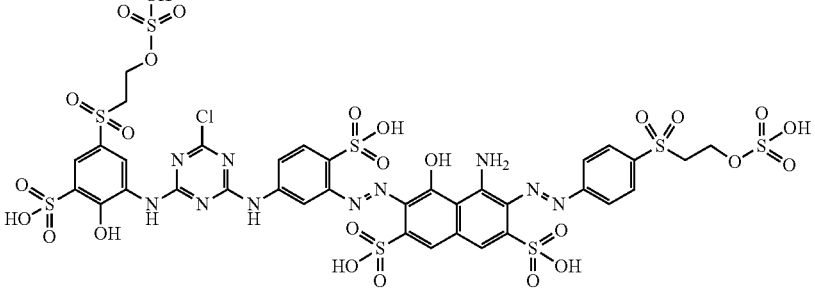 | Navy | 606 |

TABLE 1-continued

| Example | Color shade | $\lambda_{max}$ [nm] |
|---|---|---|
| 13 | Navy | 612 |
| 14 | Red | 548/524 |
| 15 | Bordeaux | 532 |

TABLE 1-continued
| Example | | Color shade | $\lambda_{max}$ [nm] |
|---|---|---|---|
| 16 | 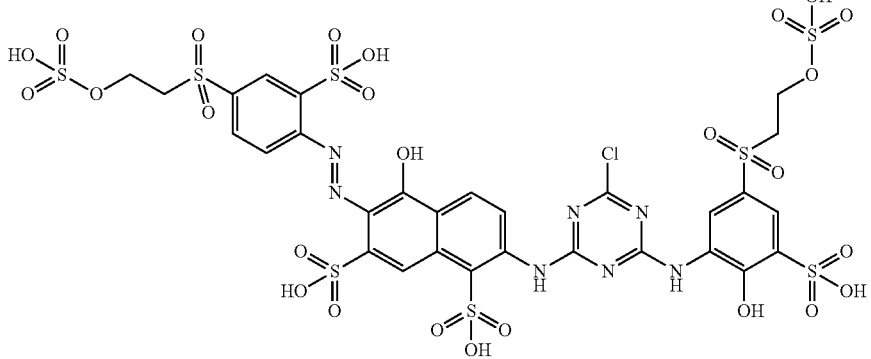 | Orange | 474 |
| 17 | 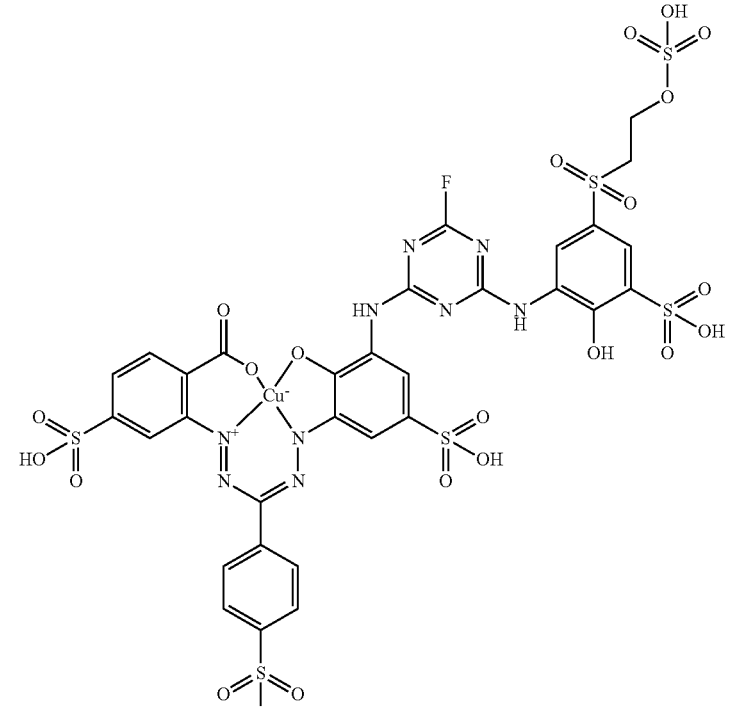 | Blue | 604 |

TABLE 1-continued
| Example | | Color shade | $\lambda_{max}$ [nm] |
|---|---|---|---|
| 18 | 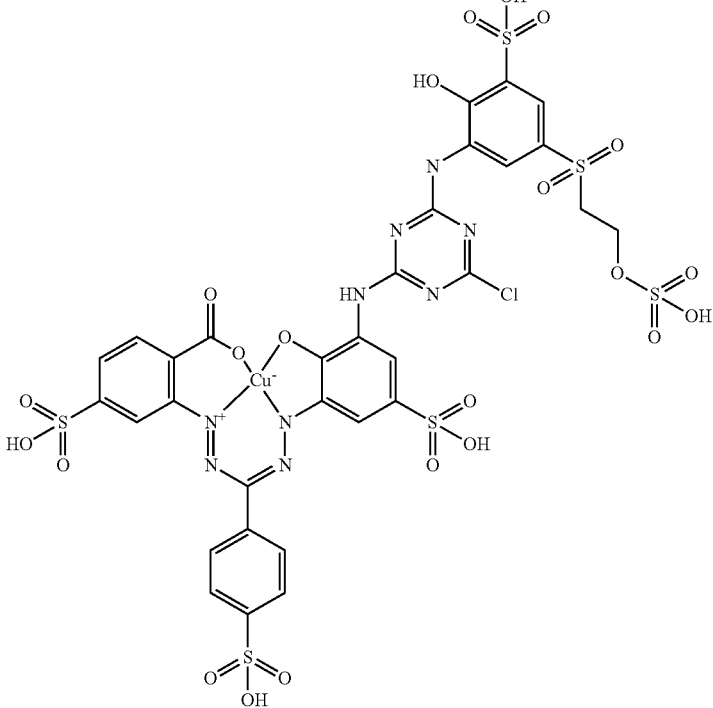 | Blue | 606 |
| 19 | 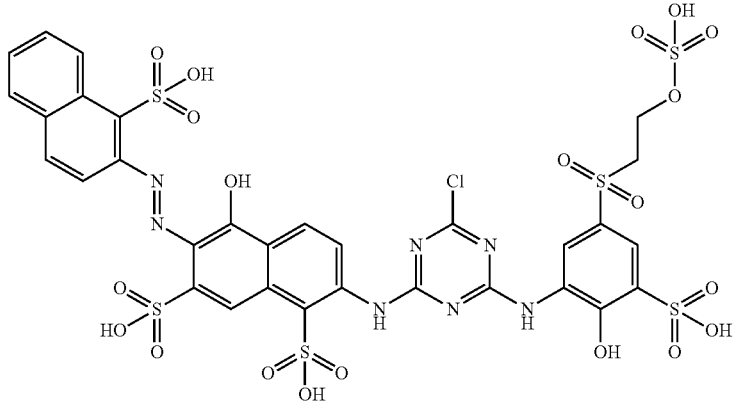 [SMILES: O=S(=O)(O)OCCS(=O)(=O)c1cc(Nc2nc(Cl)nc(Nc3ccc4c(O)c(/N=N/c5ccc6ccccc6c5S(=O)(=O)O)c(S(=O)(=O)O)cc4c3S(=O)(=O)O)n2)c(O)c(S(=O)(=O)O)c1] | Scarlet | 492 |
| 20 | 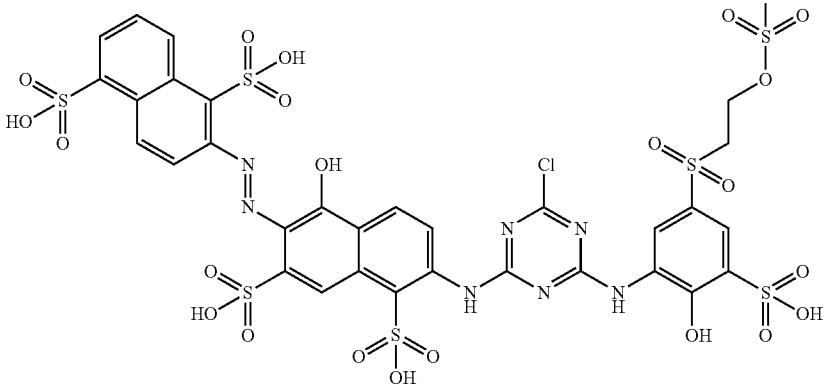 | Orange | 488 |

TABLE 1-continued
| Example | | Color shade | $\lambda_{max}$ [nm] |
|---|---|---|---|
| 21 | 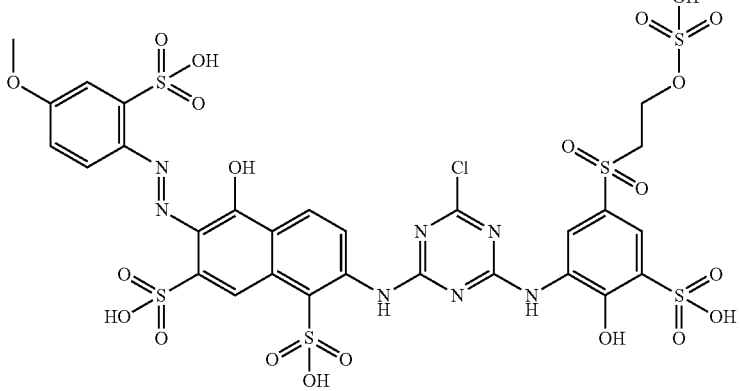 | Scarlet | 500 |
| 22 | 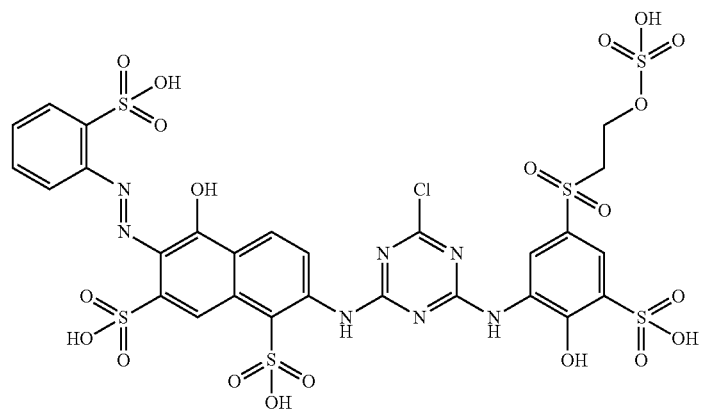 [SMILES: O=S(=O)(O)OCCS(=O)(=O)c1cc(Nc2nc(Cl)nc(Nc3ccc4c(O)c(/N=N/c5ccccc5S(=O)(=O)O)c(S(=O)(=O)O)cc4c3S(=O)(=O)O)n2)c(O)c(S(=O)(=O)O)c1] | Orange | 482 |
| 23 | 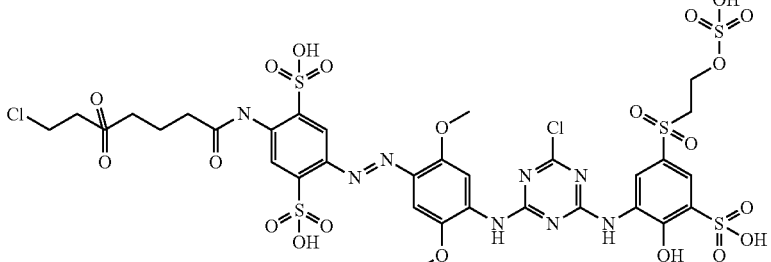 | Orange | 442 |

TABLE 1-continued
| Example | | Color shade | λ$_{max}$ [nm] |
|---|---|---|---|
| 24 | 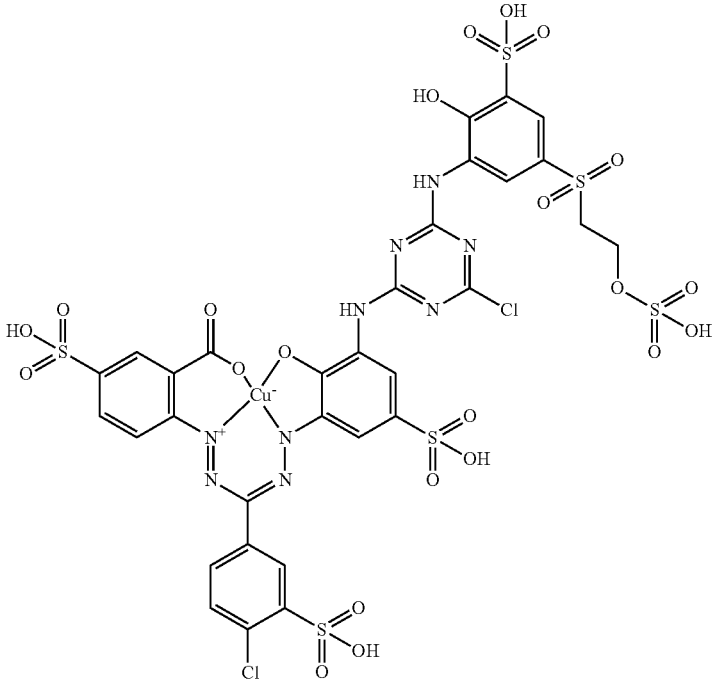 | Blue | 616 |
| 25 | 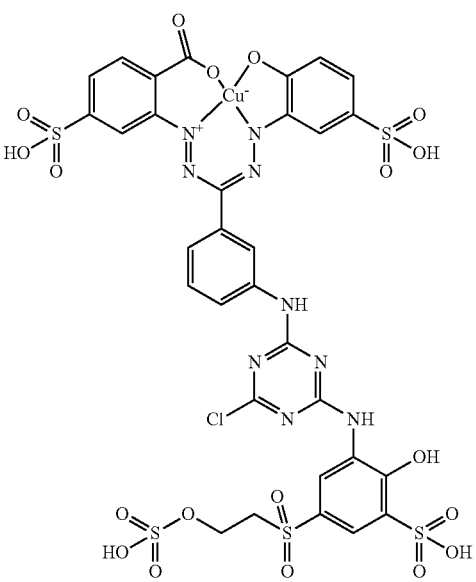 | Blue | 600 |

TABLE 1-continued

| Example | | Color shade | $\lambda_{max}$ [nm] |
|---|---|---|---|
| 26 | (structure) | Yellow | 384 |
| 27 | (structure) | Red | 520 |
| 28 | (structure) | Red | 540 |

TABLE 1-continued

| Example | | Color shade | $\lambda_{max}$ [nm] |
|---|---|---|---|
| 29 | [structure] | Red | 542/520 |
| 30 | [structure] | Violet | 542 |
| 31 | [structure] | Orange | 400 |

TABLE 1-continued
| Example | | Color shade | λ$_{max}$ [nm] |
|---|---|---|---|
| 32 | 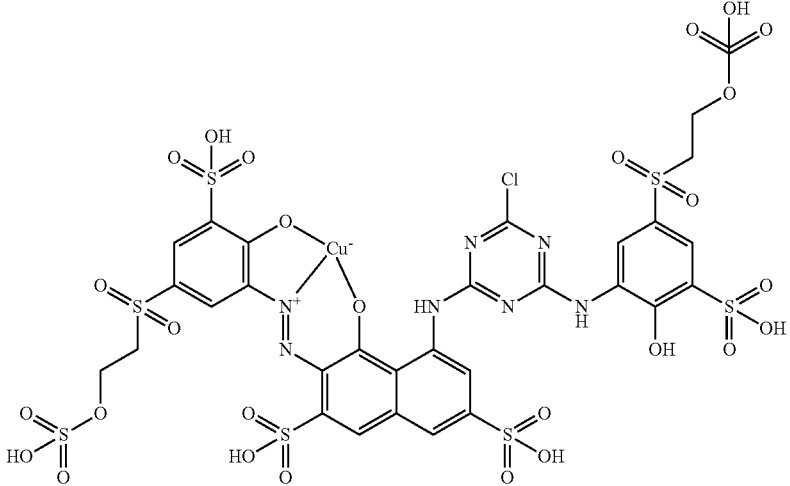 | Violet | 560 |
| 33 | 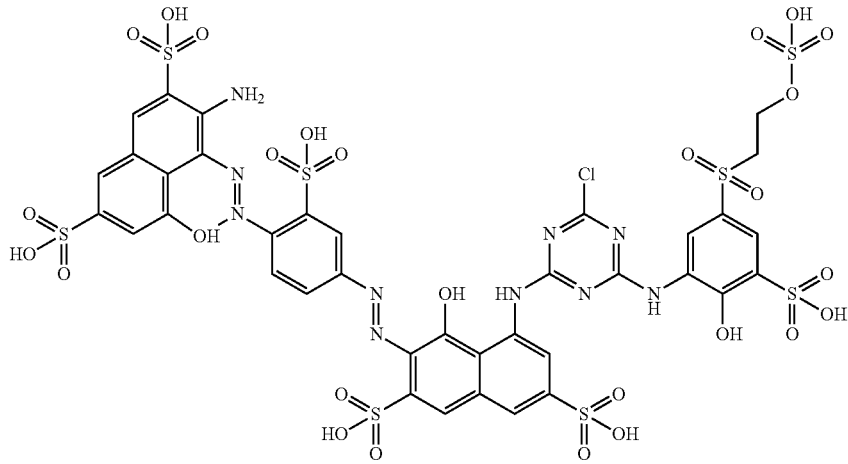 | Blue | 614 |
| 34 | 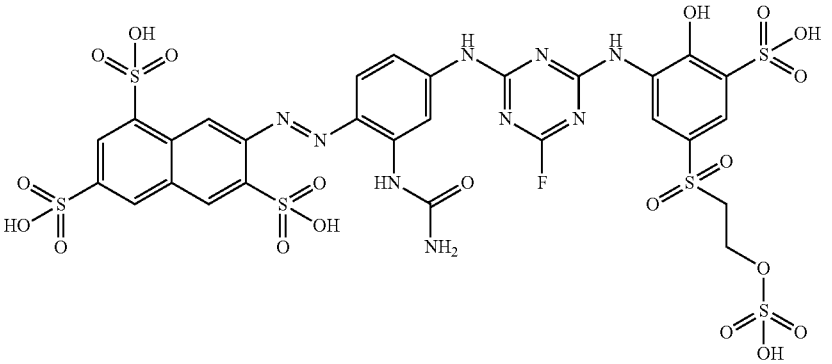 [SMILES: NC(=O)Nc1cc(Nc2nc(F)nc(Nc3cc(S(=O)(=O)CCOS(=O)(=O)O)cc(S(=O)(=O)O)c3O)n2)ccc1/N=N/c1cc2c(S(=O)(=O)O)cc(S(=O)(=O)O)cc2cc1S(=O)(=O)O] | Yellow | 414 |

TABLE 1-continued
| Example | | Color shade | $\lambda_{max}$ [nm] |
|---|---|---|---|
| 35 | 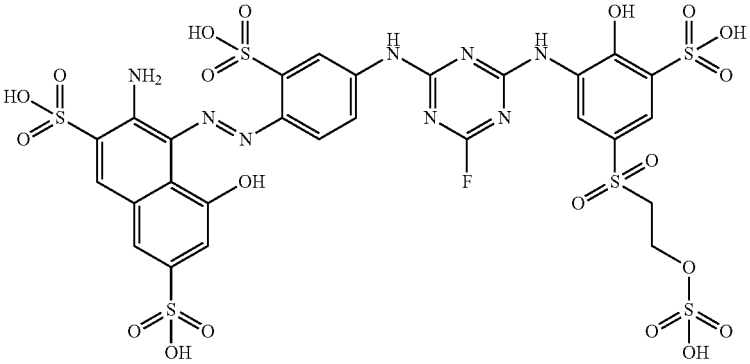 [SMILES: Nc1c(S(=O)(=O)O)cc2cc(S(=O)(=O)O)cc(O)c2c1/N=N/c1ccc(Nc2nc(F)nc(Nc3cc(S(=O)(=O)CCOS(=O)(=O)O)cc(S(=O)(=O)O)c3O)n2)cc1S(=O)(=O)O] | Red | 526 |
| 36 | 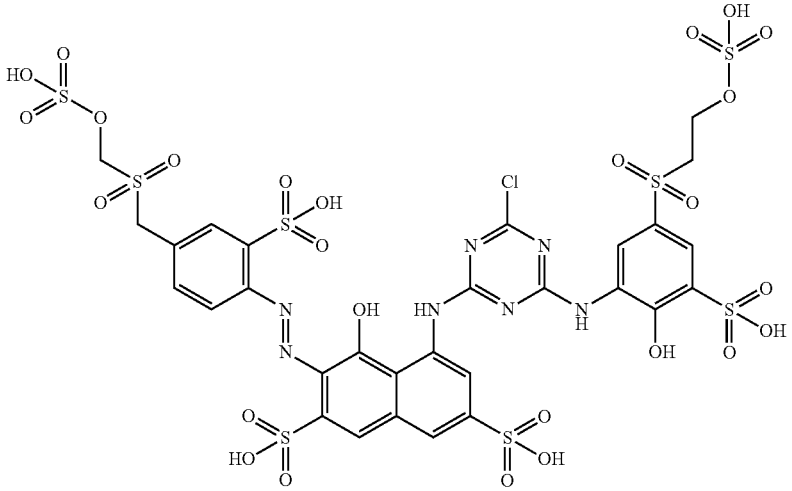 [SMILES: O=S(=O)(COS(=O)(=O)O)Cc1ccc(/N=N/c2c(S(=O)(=O)O)cc3cc(S(=O)(=O)O)cc(Nc4nc(Cl)nc(Nc5cc(S(=O)(=O)CCOS(=O)(=O)O)cc(S(=O)(=O)O)c5O)n4)c3c2O)c(S(=O)(=O)O)c1] | Red | 514 |
| 37 | 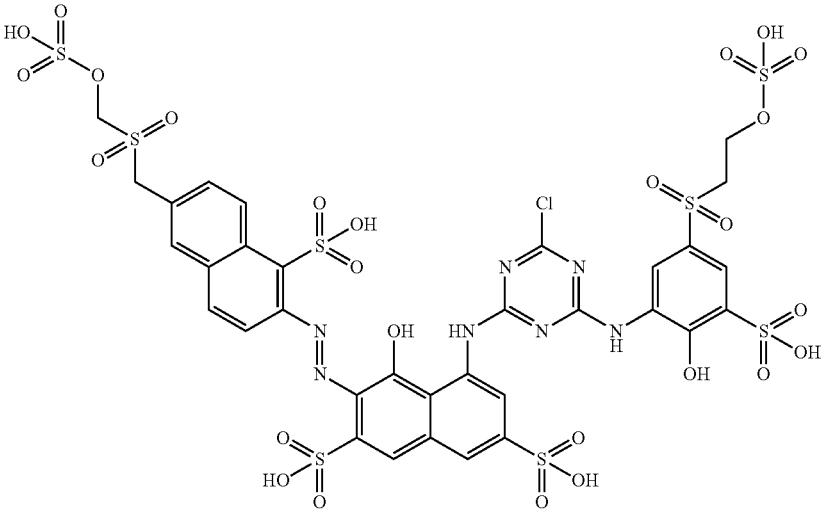 [SMILES: O=S(=O)(COS(=O)(=O)O)Cc1ccc2c(S(=O)(=O)O)c(/N=N/c3c(S(=O)(=O)O)cc4cc(S(=O)(=O)O)cc(Nc5nc(Cl)nc(Nc6cc(S(=O)(=O)CCOS(=O)(=O)O)cc(S(=O)(=O)O)c6O)n5)c4c3O)ccc2c1] | Red | 542 |

TABLE 1-continued

| Example | | Color shade | $\lambda_{max}$ [nm] |
|---|---|---|---|
| 38 | | Orange | 428 |
| 39 | | Red | 524 |
| 40 | | Yellow | 442 |
| 41 | | Red Brown | 490 |

TABLE 1-continued

| Example | | Color shade | λ$_{max}$ [nm] |
|---|---|---|---|
| 42 | | Golden Yellow | 424 |
| 43 | | Yellow | 382 |
| 44 | | Golden Yellow | 398 |
| 45 | | Golden Yellow | 410 |

TABLE 1-continued
| Example | | Color shade | $\lambda_{max}$ [nm] |
|---|---|---|---|
| 46 | 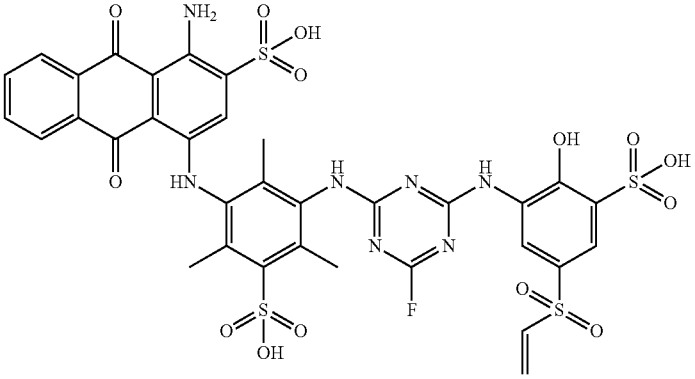 [SMILES: C=CS(=O)(=O)c1cc(Nc2nc(F)nc(Nc3c(C)c(Nc4cc(S(=O)(=O)O)c(N)c5c4C(=O)c4ccccc4C5=O)c(C)c(S(=O)(=O)O)c3C)n2)c(O)c(S(=O)(=O)O)c1] | Royal Blue | 592 |
| 47 | 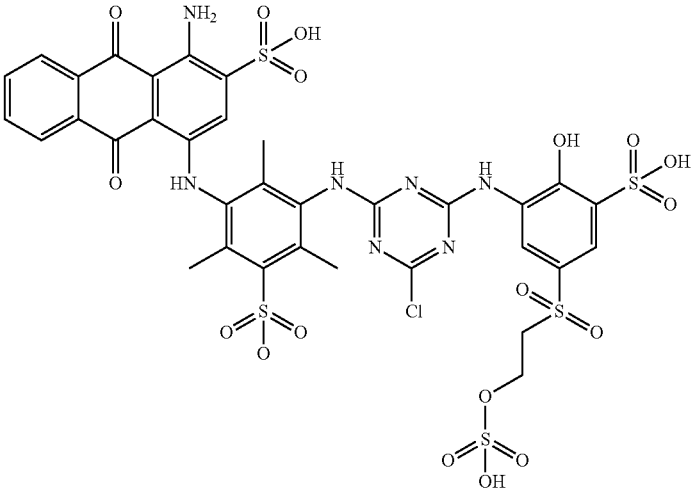 [SMILES: Cc1c(Nc2nc(Cl)nc(Nc3cc(S(=O)(=O)CCOS(=O)(=O)O)cc(S(=O)(=O)O)c3O)n2)c(C)c(S(=O)(=O)O)c(C)c1Nc1cc(S(=O)(=O)O)c(N)c2c1C(=O)c1ccccc1C2=O] | Royal Blue | 596 |
| 48 | 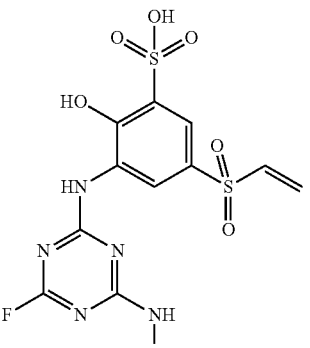 | Brilliant Blue | 586 |

TABLE 1-continued
| Example | | Color shade | $\lambda_{max}$ [nm] |
|---|---|---|---|
| | 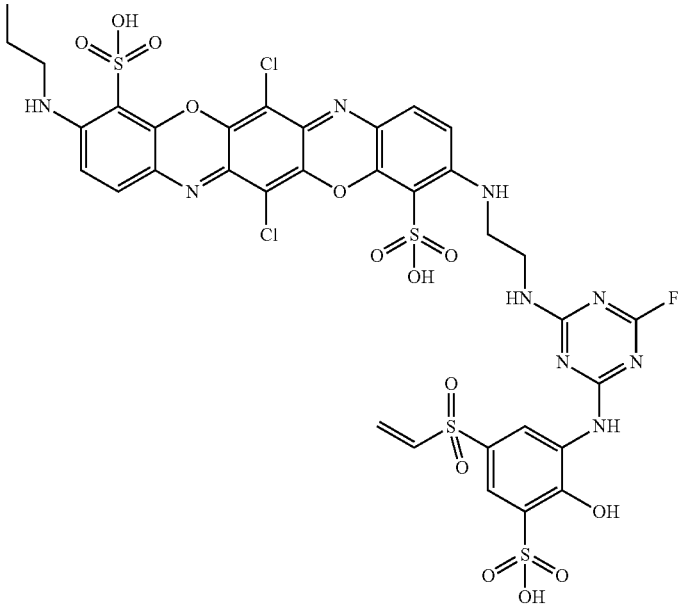 | | |
| 49 | 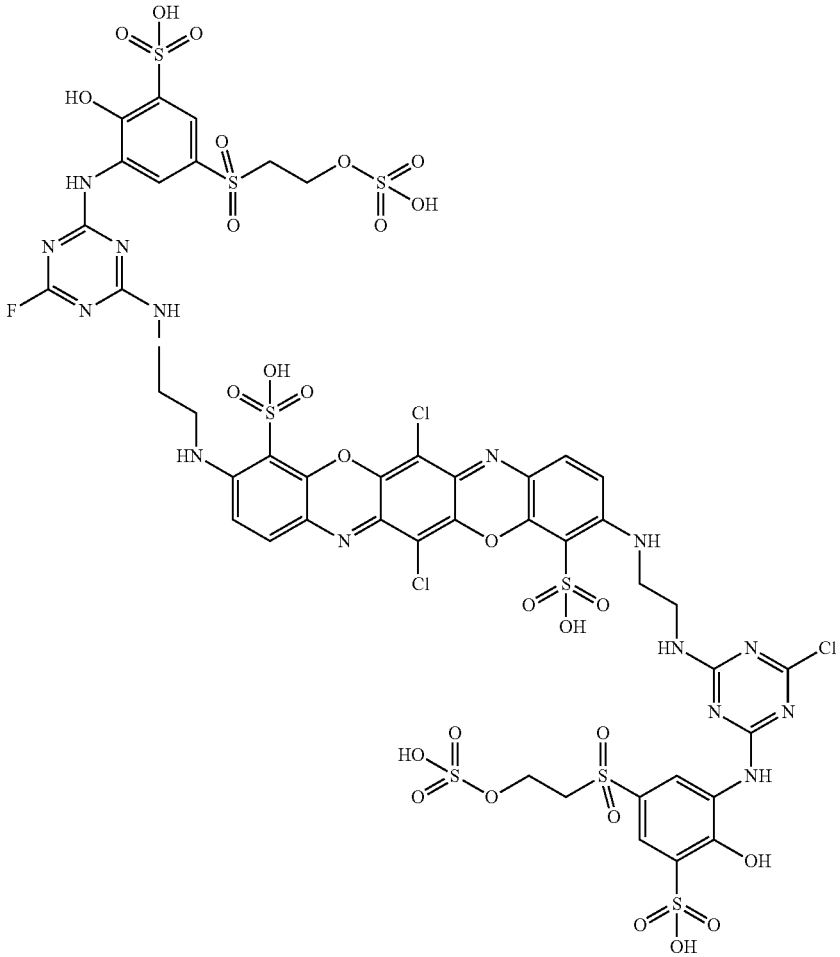 [SMILES: O=S(=O)(O)OCCS(=O)(=O)c1cc(Nc2nc(F)nc(NCCNc3ccc4c(c3S(=O)(=O)O)Oc3c(Cl)c5c(c(Cl)c3=N4)Oc3c(ccc(NCCNc4nc(Cl)nc(Nc6cc(S(=O)(=O)CCOS(=O)(=O)O)cc(S(=O)(=O)O)c6O)n4)c3S(=O)(=O)O)N=5)n2)c(O)c(S(=O)(=O)O)c1] | Brilliant Blue | 586 |

TABLE 1-continued
| Example | | Color shade | $\lambda_{max}$ [nm] |
|---|---|---|---|
| 50 | 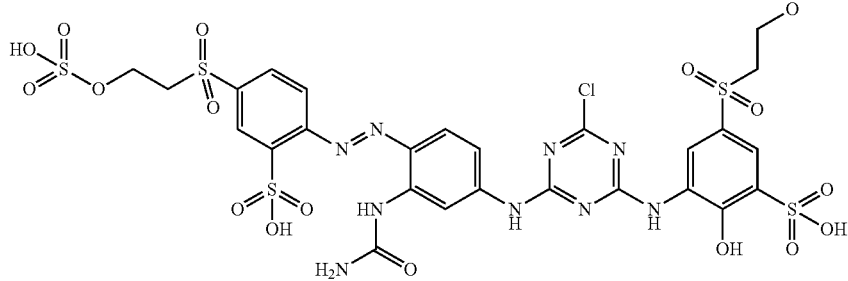 | Golden Yellow | 408 |
| 51 | 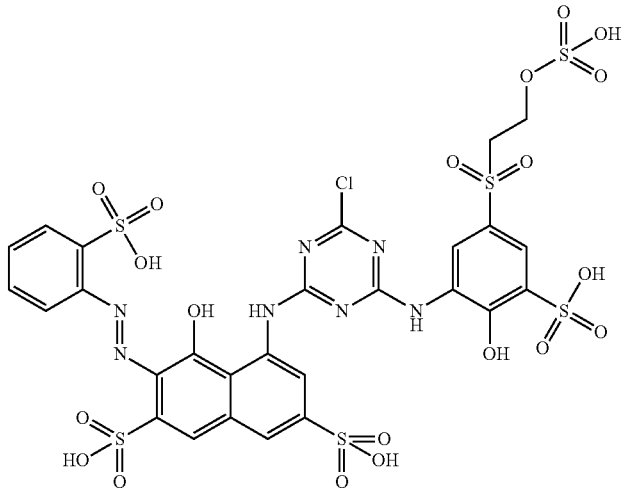 [SMILES: O=S(=O)(O)OCCS(=O)(=O)c1cc(Nc2nc(Cl)nc(Nc3cc(S(=O)(=O)O)cc4cc(S(=O)(=O)O)c(/N=N/c5ccccc5S(=O)(=O)O)c(O)c34)n2)c(O)c(S(=O)(=O)O)c1] | Red | 532/516 |
| 52 | 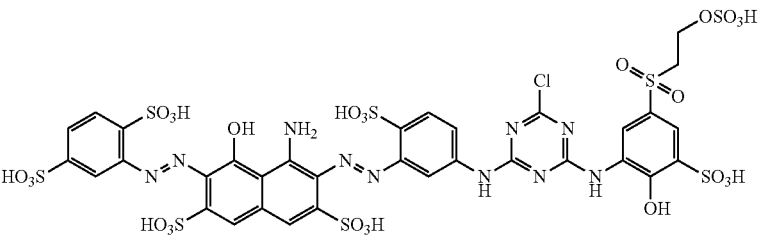 | Navy | 614 |
| 53 | 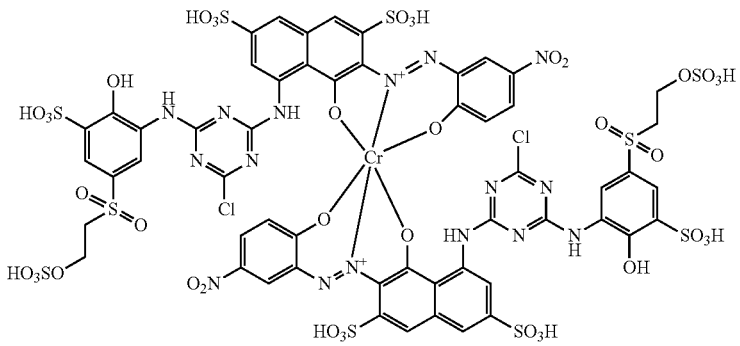 | Grey | 580 |

Dyeing Instructions I:

2 parts of the dye obtained according to Example 1 are dissolved in 400 parts of water; 1500 parts of a solution which comprises 53 g of sodium chloride per liter are added. 100 parts of cotton fabric are introduced into this dyebath at 40° C. After 45 minutes, 100 parts of a solution which comprises 16 g of sodium hydroxide and 20 g of calcined sodium carbonate per liter are added. The temperature of the dyebath is kept at 40° C. for a further 45 minutes. Thereafter, the dyed goods are rinsed, soaped at the boil with a non-ionic detergent for a quarter of an hour, rinsed again and dried.

Dyeing Instructions II:

2 parts of the reactive dye obtained according to Example 1 are dissolved in 400 parts of water; 1500 parts of a solution which comprises 53 g of sodium chloride per liter are added. 100 parts of cotton fabric are introduced into this dyebath at 35° C. After 20 minutes, 100 parts of a solution which comprises 16 g of sodium hydroxide and 20 g of calcined sodium carbonate per liter are added. The temperature of the dyebath is kept at 35° C. for a further 15 minutes. Thereafter, the temperature is increased to 60° C. in the course of 20 minutes. The temperature is kept at 60° C. for a further 35 minutes. Thereafter, the goods are rinsed, soaped at the boil with a non-ionic detergent for a quarter of an hour, rinsed again and dried.

Dyeing Instructions III:

8 parts of the reactive dye obtained according to Example 1 are dissolved in 400 parts of water; 1400 parts of a solution which comprises 100 g of sodium sulfate per liter are added. 100 parts of cotton fabric are introduced into this dyebath at 25° C. After 10 minutes, 200 parts of a solution which comprises 150 g of trisodium phosphate per liter are added. Thereafter, the temperature of the dyebath is increased to 60° C. in the course of 10 minutes. The temperature is kept at 60° C. for a further 90 minutes. Thereafter, the goods are rinsed, soaped at the boil with a non-ionic detergent for a quarter of an hour, rinsed again and dried.

Dyeing Instructions IV:

4 parts of the reactive dye obtained according to Example 1 are dissolved in 50 parts of water. 50 parts of a solution which comprises 5 g of sodium hydroxide and 20 g of calcined sodium carbonate per liter are added. A cotton fabric is padded with the resulting solution such that it increases by 70% of its weight, and is then wound onto a roll. The cotton fabric is stored in this manner at room temperature for 3 hours. The dyed goods are then rinsed, soaked at the boil with a non-ionic detergent for a quarter of an hour, rinsed again and dried.

Dyeing Instructions V:

6 parts of the reactive dye obtained according to Example 1 are dissolved in 50 parts of water. 50 parts of a solution which comprises 16 g of sodium hydroxide and 0.04 liter of water-glass (38° be) per liter are added. A cotton fabric is padded with the resulting solution such that it increases by 70% of its weight, and is then wound onto a roll. The cotton fabric is stored in this manner at room temperature for 10 hours. The dyed goods are then rinsed, soaped at the boil with a non-ionic detergent for a quarter of an hour, rinsed again and dried.

Dyeing Instructions VI:

2 parts of the reactive dye obtained according to Example 1 are dissolved in 100 parts of water with the addition of 0.5 part of sodium m-nitrobenzene sulfonate. A cotton fabric is impregnated with the resulting solution such that it increases by 75% of its weight, and is then dried. The fabric is then impregnated with a solution, warmed to 20° C., which comprises 4 g sodium hydroxide and 300 of sodium chloride per liter and squeezed off to a weight increase of 75%, and the dyeing is then steamed at 100 to 102° C. for 30 seconds, rinsed, soaped for a quarter of an hour in a 0.3% boiling solution of a non-ionic detergent, rinsed and dried.

Printing Instructions I:

3 parts of the reactive dye obtained according to Example 1 are sprinkled with high-speed stirring into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and dried and the printed material obtained is steamed in saturated steam at 102° C. for 2 minutes. The printed fabric is then rinsed, soaped at the boil and rinsed again, if appropriate, and then dried.

Printing Instructions II:

5 parts of the reactive dye obtained according to Example 51 are sprinkled with high-speed stirring into 100 parts of a stock thickener comprising 50 parts of 5% sodium alginate thickener, 36.5 parts of water, 10 parts of urea, 1 part of m sodium m-nitrobenzene sulfonate and 2.5 parts of sodium bicarbonate. A mercerised cotton satin fabric is printed with the printing paste thus obtained, the stability of which meets the technical requirements, and the resulting printed material is steamed in saturated steam at 102° C. for 8 minutes. The printed fabric is then rinsed, soaped at the boil and rinsed again, if appropriate, and then dried.

Build-up of the dyes according to the present invention and prior art dyes of similar structure is studied according to common practice in the art by preparing and applying printing pastes containing different dyestuff concentrations in accordance with the above printing instructions II. Mercerised cotton satin fabrics are printed using the pastes prepared. The reference depths of the printed fabrics are measured photospectrometrically. The build-up diagrams are prepared and the maximum build-up is determined in the usual manner. Furthermore, the degree of fixation is determined in the usual manner by cutting a specimen of the printed fabric of defined size and dissolving/extracting the unfixed dyestuff with a phosphate buffered aqueous solution (pH 7) at the boil. The reference fabric is prepared by printing without steaming in saturated steam. The following results are obtained:

Dyestuff of Example 29 of the formula
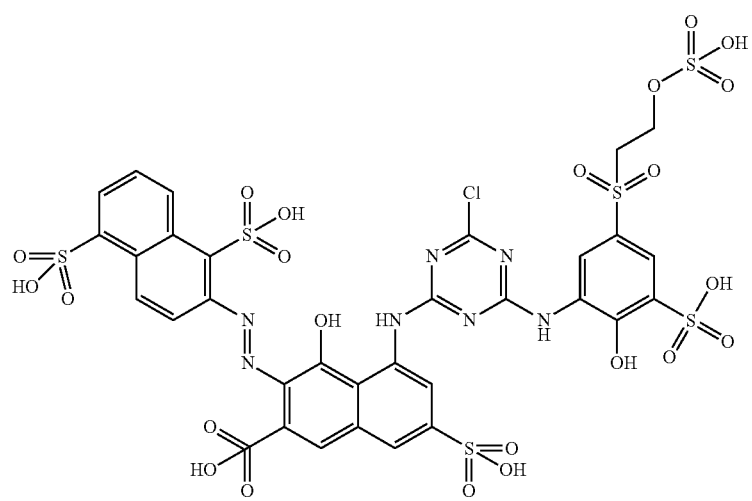
$E_{25}^*$: 0.46  
Degree of fixation: 80%
Max build-up 1.90 RD**
Dyestuff of formula
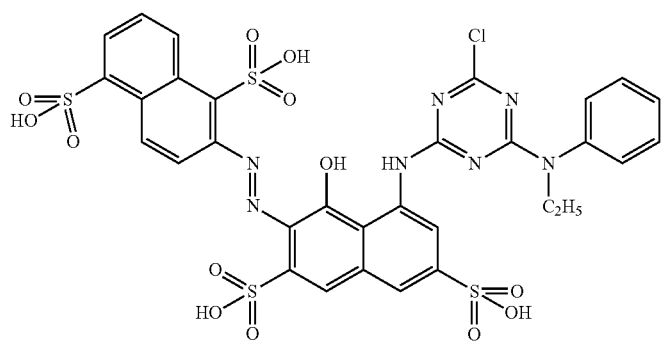 [SMILES: CCN(c1ccccc1)c1nc(Cl)nc(Nc2cc(S(=O)(=O)O)cc3cc(S(=O)(=O)O)c(/N=N/c4ccc5c(S(=O)(=O)O)cccc5c4S(=O)(=O)O)c(O)c23)n1]
$E_{25}^*$: 0.61  
Degree of fixation 66%
Max build-up 1.64 RD**
Dyestuff of Example 47 of formula
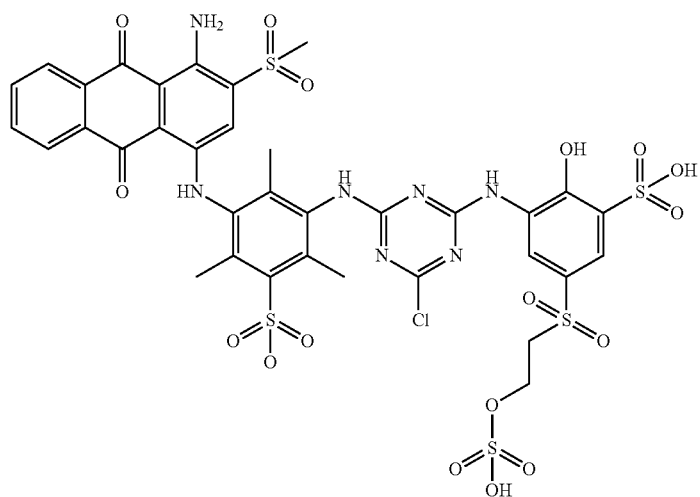 [SMILES: Cc1c(Nc2nc(Cl)nc(Nc3cc(S(=O)(=O)CCOS(=O)(=O)O)cc(S(=O)(=O)O)c3O)n2)c(C)c(S(=O)(=O)O)c(C)c1Nc1cc(S(C)(=O)=O)c(N)c2c1C(=O)c1ccccc1C2=O]
$E_{25}^*$: 0.28
Max build-up 1.40 RD**

-continued
Dyestuff of formula
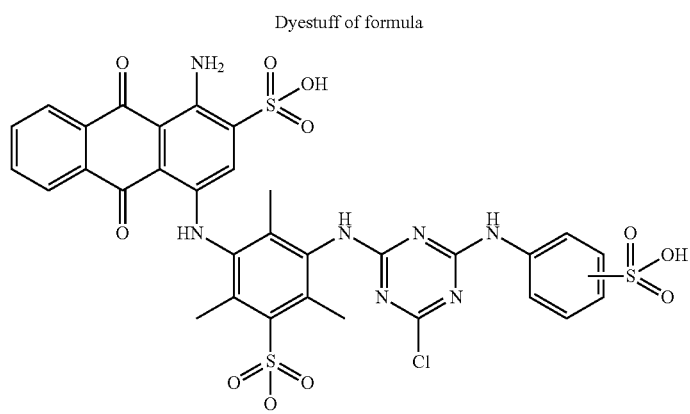
$E_{25}$*: 0.24  Max build-up 1.14 RD**
Dyestuff of Example 51 of the formula
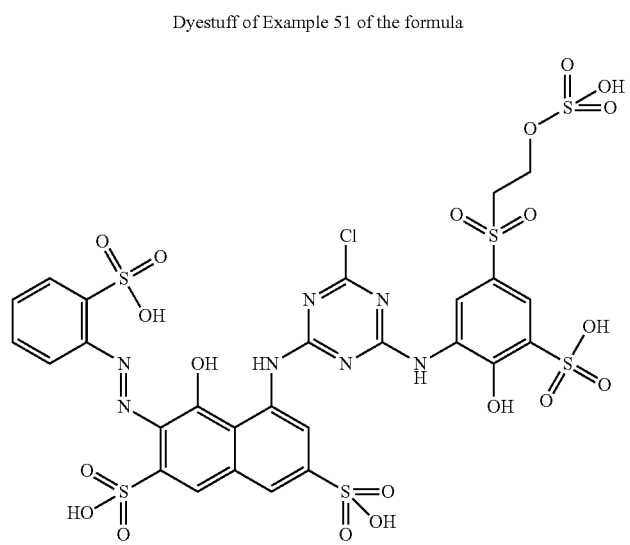
$E_{25}$*: 0.61  Max build-up 2.60 RD**
Degree of fixation: 66%
Dyestuff of formula
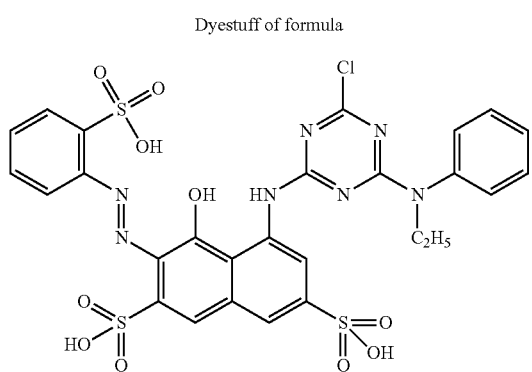
$E_{25}$*: 0.71  Max build-up 1.66 RD**
Degree of fixation: 55%
*$E_{25}$ means the extinction at $\lambda_{max}$/c = 25 mg/l
**RD means Reference Depth The dyes according to the present invention show superior build-up and a higher degree of fixation than the dyes of the prior art.

Printing Instructions III:

(a) Mercerised cotton satin is pad-dyed with a liquor containing 30 g/l of sodium carbonate and 50 g/l of urea (70% liquor pick-up) and dried.

(b) Using a drop-on-demand ink-jet head (bubble jet), the cotton satin pretreated according to Step (a) is printed with an aqueous ink containing 15% by weight of the reactive dye according to Example 1,
15% by weight of 1,2-propylene glycol and
70% by weight of water.

The print is dried completely and fixed in saturated steam for 8 minutes at 102° C., cold-rinsed, washed off at the boil, rinsed again and dried.

What is claimed is:

1. A reactive dye of formula (1)

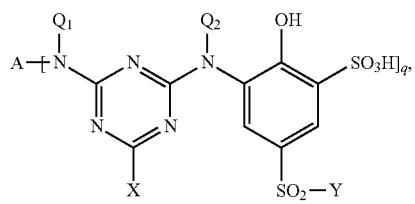
(1)

wherein $Q_1$ and $Q_2$ are each independently of the other hydrogen or unsubstituted or substituted $C_1$-$C_4$ alkyl, A is the radical of a monoazo, polyazo, metal complex azo, anthraquinone, phthalocyanine, formazan or dioxazine chromophore, X is halogen, 3- or 4-carboxypyridin-1-yl, or 3- or 4-carbamoylpyridin-1-yl, Y is vinyl or a radical —CH$_2$—CH$_2$—U and U is —Cl, —Br, —F, —OSO$_3$H, —SSO$_3$H, —OCO—CH$_3$, —OPO$_3$H$_2$, —OCO—C$_6$H$_5$, —OSO$_2$—C$_1$-C$_4$ alkyl or —OSO$_2$—N(C$_1$-C$_4$ alkyl)$_2$, and q is the number 1 or 2.

2. A reactive dye according to claim 1, wherein $Q_1$ and $Q_2$ are hydrogen.

3. A reactive dye according to claim 1, wherein X is fluorine or chlorine.

4. A reactive dye according to claim 1, wherein U is —Cl, —OSO$_3$H, —SSO$_3$H, —OCO—CH$_3$, —OCO—C$_6$H$_5$ or —OPO$_3$H$_2$.

5. A reactive dye according to claim 1, wherein q is the number 1.

6. A reactive dye according to claim 1, wherein A is a radical of a mono-azo dye selected from the group consisting of the formulae (2a), (2b), (2c), (2d), (2e), (2f), (2g), (2h), (2i), (2j) and (6)

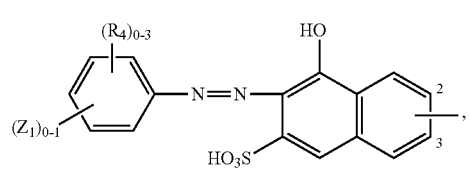
(2a)

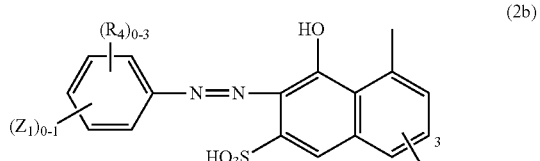
(2b)

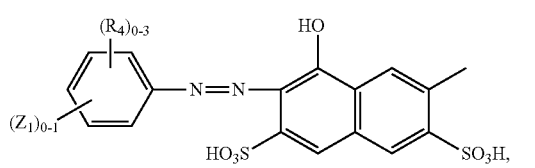
(2c)

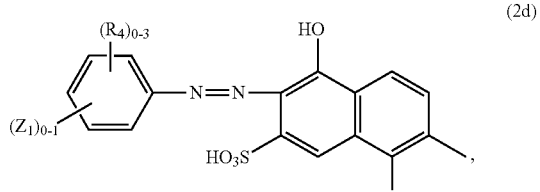
(2d)

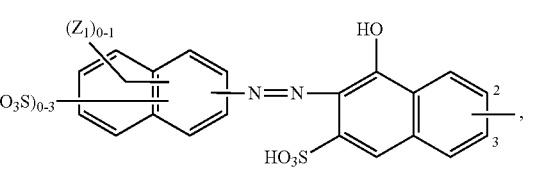
(2e)

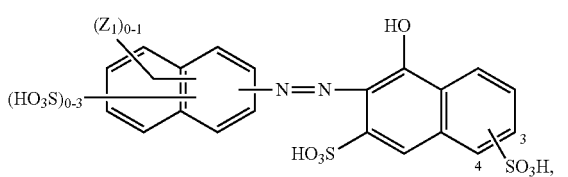
(2f)

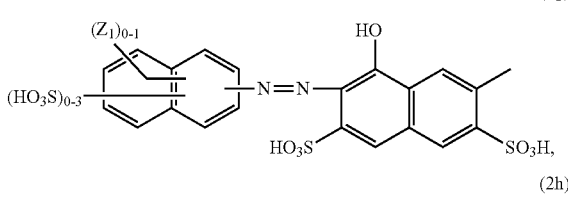
(2g)

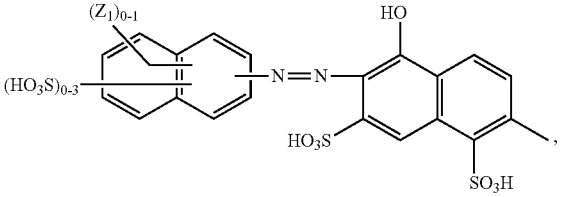
(2h)

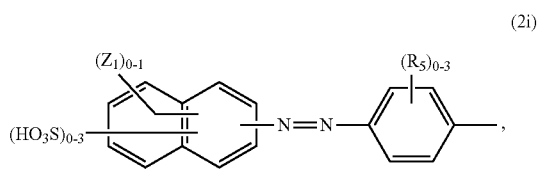
(2i)

-continued

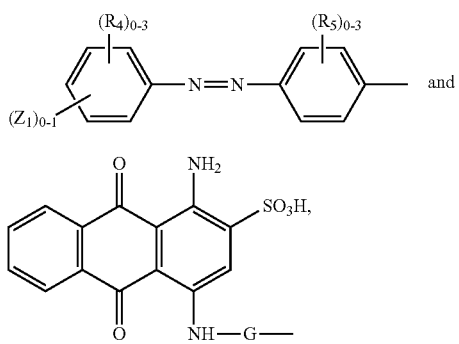

wherein $(R_4)_{0-3}$ denotes from 0 to 3 identical or different substituents selected from the group consisting of $C_1$-$C_4$ alkyl, $C_1$-$C_4$ alkoxy, halogen, carboxy and sulfo, and $Z_1$ is a fibre-reactive radical of formula (9a), (9b) or (9f)

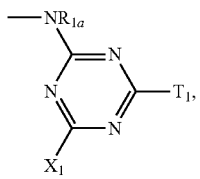

wherein

Y is vinyl or a radical —$CH_2$—$CH_2$—U and U is —Cl or —$OSO_3H$, $R_{1a}$ is hydrogen, l is the number 3, $X_1$ is chlorine or fluorine, $T_1$ is a fibre-reactive radical of formula (10b') or (10c')

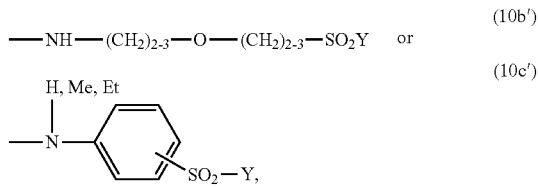

wherein

Me is methyl, and Et is ethyl, and the nitrogen atom in formula (10c') is substituted by hydrogen, methyl or ethyl, $(R_5)_{0-3}$ denotes from 0 to 3 identical or different substituents selected from the group consisting of halogen, nitro, cyano, trifluoromethyl, sulfamoyl, carbamoyl, $C_1$-$C_4$ alkyl; $C_1$-$C_4$ alkoxy unsubstituted or substituted by hydroxy, sulfato or by $C_1$-$C_4$ alkoxy; amino, $C_2$-$C_4$ alkanoylamino, ureido, hydroxy, carboxy, sulfomethyl, $C_1$-$C_4$ alkylsulfonylamino, sulfo and a fibre-reactive radical of the formulae (9b) and (9f), wherein the radicals $R_{1a}$, Y, $T_1$, $X_1$ and l are as defined above, and G is a phenylene radical unsubstituted or substituted by $C_1$-$C_4$ alkyl, $C_1$-$C_4$ alkoxy or by sulfo.

7. A reactive dye according to claim 1, wherein A is a dye radical of formula (2k), (2l), (2m), (4a), (4b), (4c) or (4d),

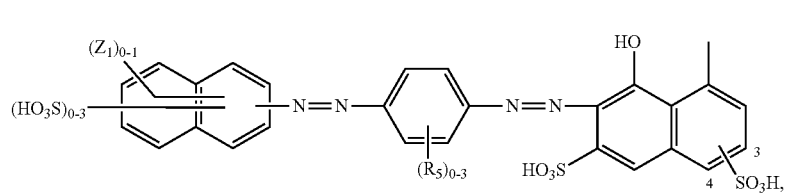

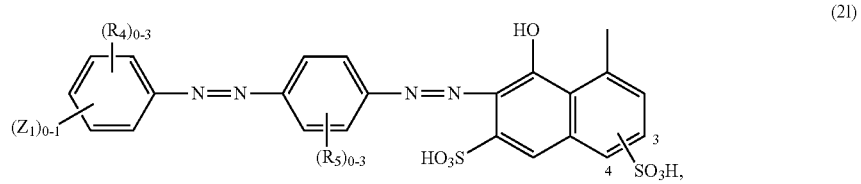

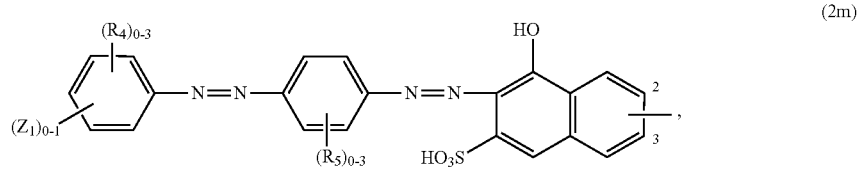

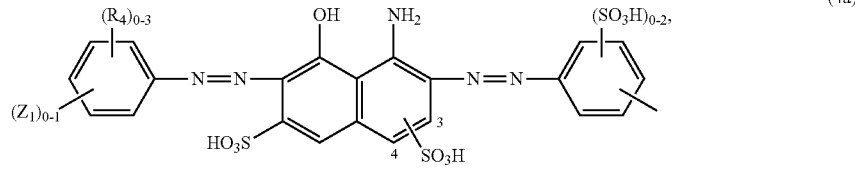

-continued

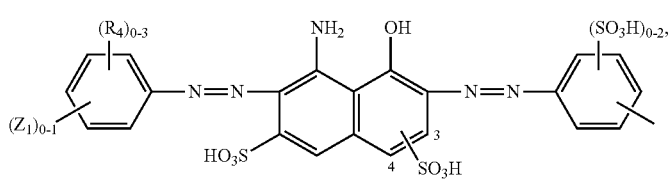
(4b)

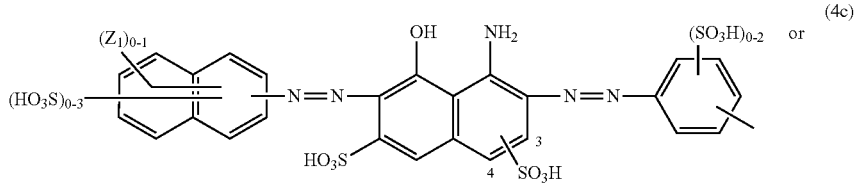
(4c) or

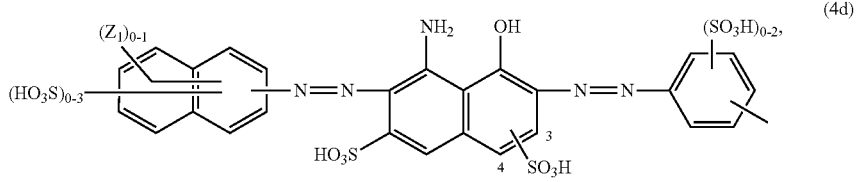
(4d)

wherein
$(R_4)_{0-3}$ denotes from 0 to 3 identical or different substituents selected from the group consisting of $C_1$-$C_4$ alkyl, $C_1$-$C_4$ alkoxy, halogen, carboxy and sulfo, and
$Z_1$ is a fibre-reactive radical of formula (9a), (9b) or (9f)

(9a)

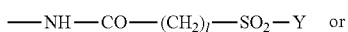
(9b)

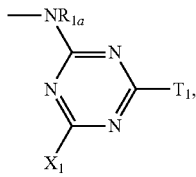
(9f)

wherein
Y is vinyl or a radical —$CH_2$—$CH_2$—U and U is —Cl or —$OSO_3H$,
$R_{1a}$ is hydrogen,
l is the number 3,
$X_1$ is chlorine or fluorine,
$T_1$ is a fibre-reactive radical of formula (10b') or (10c')

(10b')

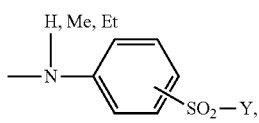
(10c')

wherein
Me is methyl, and Et is ethyl, and the nitrogen atom in formula (10c') is substituted by hydrogen, methyl or ethyl,
$(R_5)_{0-3}$ denotes from 0 to 3 identical or different substituents selected from the group consisting of halogen, nitro, cyano, trifluoromethyl, sulfamoyl, carbamoyl, $C_1$-$C_4$ alkyl; $C_1$-$C_4$ alkoxy unsubstituted or substituted by hydroxy, sulfato or by $C_1$-$C_4$ alkoxy; amino, $C_2$-$C_4$ alkanoylamino, ureido, hydroxy, carboxy, sulfomethyl, $C_1$-$C_4$ alkylsulfonylamino, sulfo and a fibre-reactive radical of the formulae (9b) and (9f), wherein the radicals $R_{1a}$, Y, $T_1$, $X_1$ and l are as defined above.

8. A reactive dye according to claim 1, wherein $Q_1$ and $Q_2$ are hydrogen, q is the number 1, X is chlorine or fluorine, Y is vinyl, β-chloroethyl or β-sulfatoethyl, and A is a dye radical of the formula (2b), (2f), (2i), (2j) or (6),

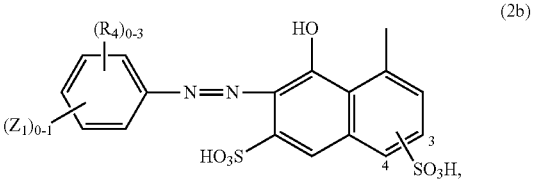
(2b)

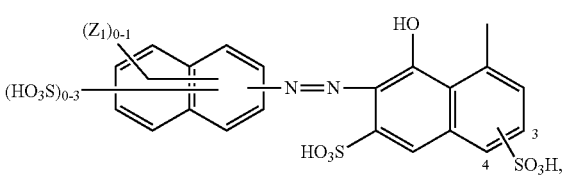
(2f)

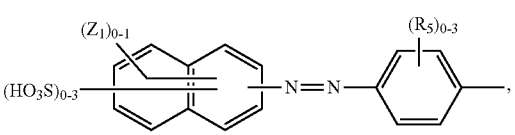
(2i)

(2j)

or

-continued (6)

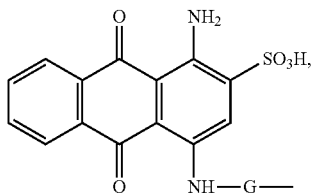

wherein $(R_4)_{0-3}$ denotes from 0 to 3 identical or different substituents selected from the group consisting of $C_1$-$C_4$ alkyl, $C_1$-$C_4$ alkoxy, halogen, carboxy and sulfo, and $Z_1$ is a fibre-reactive radical of formula (9a), (9b) or (9f)

—$SO_2$—Y, (9a)

—NH—CO—$(CH_2)_l$—$SO_2$—Y or (9b)

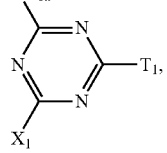

(9f)

wherein

Y is vinyl or a radical —$CH_2$—$CH_2$—U and U is —Cl or —$OSO_3H$, $R_{1a}$ is hydrogen, l is the number 3, $X_1$ is chlorine or fluorine, $T_1$ is a fibre-reactive radical of formula (10b') or (10c')

—NH—$(CH_2)_{2-3}$—O—$(CH_2)_{2-3}$—$SO_2Y$ or (10b')

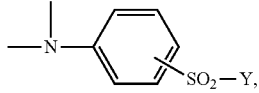

(10c')

wherein

Me is methyl, and Et is ethyl, and the nitrogen atom in formula (10c') is substituted by hydrogen, methyl or ethyl, $(R_5)_{0-3}$ denotes from 0 to 3 identical or different substituents selected from the group consisting of halogen, nitro, cyano, trifluoromethyl, sulfamoyl, carbamoyl, $C_1$-$C_4$ alkyl; alkoxy unsubstituted or substituted by hydroxy, sulfato or by $C_1$-$C_4$ alkoxy; amino, $C_2$-$C_4$ alkanoylamino, ureido, hydroxy, carboxy, sulfomethyl, alkyl-sulfonylamino, sulfo and a fibre-reactive radical of the formulae (9b) and (9f), wherein the radicals $R_{1a}$, Y, $T_1$, $X_1$ and l are as defined above, and G is a phenylene radical unsubstituted or substituted by $C_1$-$C_4$ alkyl, $C_1$-$C_4$ alkoxy or by sulfo.

9. A process for the preparation of the reactive dye of formula (1) of claim 1, wherein q is the number 1, which comprises reacting with one another, in any order, approximately one molar equivalent of an amino dye compound of formula (11a)

A-NHQ$_1$ (11a), approximately one molar equivalent of a compound of formula (12)

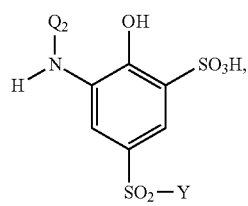

(12)

and approximately one molar equivalent of a halotriazine, wherein $Q_1$, $Q_2$, A, X and Y in each case being as defined in claim 1.

10. A process for the preparation of the reactive dye of formula (1) of claim 1, wherein q is the number 2, which comprises reacting with one another, in any order, approximately two molar equivalents of an amino dye compound of formula (11b)

$Q_1$HN-A-NHQ$_1$ (11b), approximately two molar equivalents of a compound of formula (12)

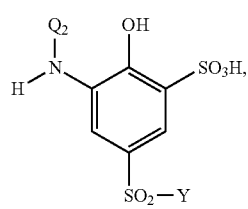

(12)

and approximately two molar equivalents of a halotriazine wherein $Q_1$, $Q_2$, A, X and Y in each case being as defined in claim 1.

11. A process for dyeing or printing hydroxyl-group containing or nitrogen-containing fibre material comprising applying the reactive dye of formula (1) of claim 1 to fibre material.

12. The process of claim 11, wherein the fibre material is a cotton material.

* * * * *